(12) United States Patent
Kondo et al.

(10) Patent No.: US 10,587,134 B2
(45) Date of Patent: *Mar. 10, 2020

(54) BATTERY PACK

(71) Applicant: MAKITA CORPORATION, Anjo-shi (JP)

(72) Inventors: Eiji Kondo, Anjo (JP); Hironori Ogura, Anjo (JP); Takuya Umemura, Anjo (JP); Hideyuki Taga, Anjo (JP); Yoshihiro Ishikawa, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,580

(22) Filed: May 24, 2019

(65) Prior Publication Data

US 2019/0280501 A1 Sep. 12, 2019

Related U.S. Application Data

(63) Continuation of application No. 15/015,209, filed on Feb. 4, 2016, now Pat. No. 10,348,110.

(30) Foreign Application Priority Data

Feb. 13, 2015 (JP) .................................. 2015-026325
Apr. 28, 2015 (JP) .................................. 2015-091393

(51) Int. Cl.
*H02J 7/00* (2006.01)
*H01M 2/10* (2006.01)
(Continued)

(52) U.S. Cl.
CPC ......... *H02J 7/0045* (2013.01); *H01M 2/1016* (2013.01); *H01M 2/1022* (2013.01);
(Continued)

(58) Field of Classification Search
CPC .... H02J 7/0045; H02J 7/0063; H01M 2/1016; H01M 2/1022
(Continued)

(56) References Cited

U.S. PATENT DOCUMENTS 8,684,106 B2    4/2014 Hanawa et al.
10,348,110 B2 *  7/2019 Kondo
(Continued)

FOREIGN PATENT DOCUMENTS

EP    2339671 A1    6/2011
EP    2787559 A1    10/2014
(Continued)

OTHER PUBLICATIONS

Extended European Search Report from the European Patent Office dated Jul. 25, 2016 in related EP application No. 16 155 037.1, including Search Opinion, Search Report and examined claims 1-15.
(Continued)

*Primary Examiner* — Edward Tso
*Assistant Examiner* — Aaron Piggush
(74) *Attorney, Agent, or Firm* — J-TEK Law PLLC; Jeffrey D. Tekanic; Scott T. Wakeman

(57) ABSTRACT

A battery pack (30) is configured to couple to a power tool (10) by sliding in a sliding direction and it contains a plurality of cells (31). A pair of battery-side, electric-power terminals (312a, 312b, 314a, 314b) and a battery-side signal terminal (313) can be electrically connected to a pair of tool-side, power-supply terminals (212, 214) and a tool-side signal terminal (213), respectively, which are provided on the power tool (10). The pair of battery-side, electric-power terminals (312a, 312b, 314a, 314b) and the battery-side signal terminal (313) are disposed in parallel adjacently in a direction that intersects the sliding direction.

28 Claims, 14 Drawing Sheets

(51) Int. Cl.
   *H01M 2/30*   (2006.01)
   *H01M 10/42*  (2006.01)
(52) U.S. Cl.
   CPC ............ *H01M 2/30* (2013.01); *H02J 7/0063* (2013.01); *H01M 2/105* (2013.01); *H01M 2010/4278* (2013.01); *H01M 2220/30* (2013.01); *H02J 2007/0067* (2013.01)
(58) Field of Classification Search
   USPC .......................................... 320/112, 114, 134
   See application file for complete search history.

(56) References Cited

U.S. PATENT DOCUMENTS

| | | | |
|---|---|---|---|
| 2006/0091858 A1 | 5/2006 | Johnson et al. | |
| 2007/0108941 A1* | 5/2007 | Sainomoto | H02J 7/0021 |
| | | | 320/112 |
| 2008/0061738 A1 | 3/2008 | Hanawa et al. | |
| 2010/0112435 A1 | 5/2010 | Hanawa et al. | |
| 2011/0005793 A1 | 1/2011 | Hanawa et al. | |
| 2011/0025269 A1* | 2/2011 | Funabashi | H02J 7/0026 |
| | | | 320/110 |
| 2011/0250780 A1 | 10/2011 | Fukumoto et al. | |
| 2011/0253402 A1* | 10/2011 | Aradachi | H01M 2/1055 |
| | | | 173/46 |
| 2013/0143452 A1 | 6/2013 | Yoshikawa | |
| 2014/0302377 A1 | 10/2014 | Naito | |
| 2018/0262150 A1* | 9/2018 | White | H02J 7/0024 |

FOREIGN PATENT DOCUMENTS

| | | |
|---|---|---|
| JP | H09285030 A | 10/1997 |
| JP | 2008066148 A | 3/2008 |
| JP | 2009238538 A | 10/2009 |
| JP | 2011218514 A | 11/2011 |
| JP | 2011222171 A | 11/2011 |
| JP | 2011222459 A | 11/2011 |
| JP | 2013120653 A | 6/2013 |
| JP | 2013191288 A | 9/2013 |
| JP | 2014203660 A | 10/2014 |
| JP | 2014203704 A | 10/2014 |

OTHER PUBLICATIONS

Office Action from the Japanese Patent Office dispatched Aug. 20, 2018 in related Japanese application No. 2015-091393, and translation thereof.

* cited by examiner

BATTERY PACK

CROSS-REFERENCE

This application is a continuation application of U.S. Ser. No. 15/015,209, filed on Feb. 4, 2016, now U.S. Pat. No. 10,348,110, which claims priority to Japanese patent application serial number 2015-026325, filed on Feb. 13, 2015, and to Japanese patent application serial number 5 2015-091393, filed on Apr. 28, 2015, the contents of which applications are incorporated herein by reference in their entireties.

TECHNICAL FIELD

The present invention generally relates to a battery pack configured to couple to a battery-mounting part of a power tool by sliding in a sliding direction and that comprises a plurality of battery cells.

BACKGROUND ART

A battery pack described in Japanese Laid-open Patent Publication 2014-203704 is shown in FIG. 27, and comprises a box-shaped housing 102 that stores a plurality of battery cells. Left and right sliding rails 103, which are configured such that the pair slidably mates with a battery-mounting part (not shown) of a power tool or a battery-mounting part (not shown) of a charger, are provided on an upper surface of the housing 102. In addition, a positive-terminal slit 105p and a negative-terminal slit 105n are provided on inner sides, in a width direction, of the left and right sliding rails 103. A positive terminal and a negative terminal of battery-side, electric-power terminals are provided on inner sides of the slits 105p, 105n, respectively. In addition, signal connectors (terminals) 107 are provided between the positive-terminal slit 105p and the negative-terminal slit 105n.

When the battery pack 100 has been slid onto and thereby connected to the battery-mounting part of the power tool, the positive terminal and the negative terminal of the battery pack 100 are electrically connected to the positive terminal and the negative terminal, respectively, of the power tool. In the alternative, when the battery pack 100 has been slid onto and thereby connected to the battery-mounting part of the charger, the positive terminal and the negative terminal of the battery pack 100 are electrically connected to the positive terminal and the negative terminal, respectively, of the charger. In addition, the signal connectors 107 of the battery pack 100 are connected to the signal connectors (not shown) of the charger.

SUMMARY OF THE INVENTION

In the above-described, known battery pack 100, the signal connectors 107 are provided between the positive-terminal slit 105p (the positive terminal) and the negative-terminal slit 105n (the negative terminal). However, the signal connectors 107 are necessary for communication when the battery pack 100 is mounted on the battery-mounting part of the charger but are unnecessary when the battery pack 100 is connected to the battery-mounting part of the power tool, because the power tool does not utilize the signals from the signal connectors 107. Consequently, a space for storing the signal connectors 107 between the positive terminal and the negative terminal must be provided in the battery-mounting part of the power tool. In view of this fact, in the battery-mounting part of the power tool, the spacing between the positive terminal and the negative terminal is unnecessarily large, and therefore it becomes difficult to make the battery-mounting part compact.

An object of the present teachings is to disclose designs for battery packs that enable a battery-mounting part of a power tool to be made more compact.

In a first aspect of the present teachings, a battery pack is configured to couple to a power tool by sliding in a sliding direction. The battery pack comprises a plurality of battery cells. In addition, the battery pack comprises: a pair of battery-side, electric-power (plus and minus power) terminals and at least one battery-side (first) signal terminal, wherethrough a signal is transmitted externally of the battery pack (e.g., to the power tool or to a charger). When the battery pack is coupled to the power tool, the battery-side, electric-power (plus and minus power) terminals and the and at least one battery-side (first) signal terminal electrically connect to a pair of tool-side, power-supply (corresponding plus and minus) terminals and at least one (corresponding) tool-side signal terminal, respectively, which are provided on the power tool. The pair of battery-side, electric-power terminals and the battery-side signal terminal are disposed in parallel adjacently in a direction that intersects the sliding direction, e.g., a direction orthogonal or at least substantially orthogonal to the sliding direction. As used anywhere herein, the expression "direction that intersects" is intended to include not only, e.g., the direction that intersects the sliding direction and a rectilinear direction oblique to the sliding direction, but also an oblique zigzag arrangement with respect to the sliding direction.

In such an embodiment of the present teachings, the dimension (length), from a one end to the other end, of the pair of battery-side, electric-power terminals and the at least one battery-side signal terminal in the direction orthogonal to the sliding direction can be shortened. Consequently, the dimension (length), from the one end to the other end, of the pair of tool-side, power-supply terminals and the tool-side signal terminal of the power tool in the direction orthogonal to the sliding direction also can be shortened. As a result, it becomes possible to make a battery-mounting part of the power tool more compact (narrower) in the width direction of the battery-mounting part (i.e. in the direction orthogonal to the sliding direction relative to the battery pack).

In a second aspect of the present teachings, a battery pack is configured to couple to a power tool by sliding in a sliding direction. The battery pack comprises a plurality of battery cells. In addition, the battery pack comprises: a pair of battery-side, electric-power (plus and minus) terminals and at least one battery-side (first) signal terminal, wherethrough a signal is transmitted externally of the battery pack (e.g., to the power tool or to a charger). When the battery pack is coupled to the power tool, the battery-side, electric-power (plus and minus power) terminals and the and at least one battery-side (first) signal terminal electrically connect to a pair of tool-side, power-supply (corresponding plus and minus) terminals and at least one (corresponding) tool-side signal terminal, respectively, which are provided on the power tool. The pair of battery-side, electric-power terminals and the battery-side signal terminal are spaced apart by a predetermined spacing in a direction that intersects (e.g., is orthogonal to) the sliding direction.

According to a third aspect of the present teachings, the pair of battery-side, electric-power terminals and the battery-side signal terminal are spaced apart by the minimum spacing required to prevent a short circuit.

According to a fourth aspect of the present teachings, the battery-side (first) signal terminal is disposed between the pair of battery-side, electric-power terminals. Such an arrangement tends to reduce the likelihood of a short circuit between terminals.

In a fifth aspect of the present teachings, the battery pack further comprises: at least one charging-dedicated, battery-side (second) signal terminal. When the battery pack is coupled to a charger by sliding in the sliding direction, the pair of battery-side, electric-power terminals electrically connects to a pair of (corresponding) charging-electric-power terminals of the charger, and the battery-side signal terminal and the charging-dedicated, battery-side signal terminal(s) are electrically connected to charger-side signal terminals of the charger. In addition, the charging-dedicated, battery-side (second) signal terminal(s) is (are) preferably disposed on an outer side, in the direction that the terminals are disposed in parallel, of the pair of battery-side, electric-power terminals and the battery-side (first) signal terminal. In such an embodiment, because the charging-dedicated, battery-side (second) signal terminal(s), which is (are) not used when the battery pack is connected to the power tool, is (are) disposed on the outer side(s) in the direction that the terminals are disposed in parallel, the battery-mounting part of the power tool can be designed narrower.

According to a sixth aspect of the present teachings, the battery-side signal terminal(s) is (are) configured to transmit one or more signals to the power tool for use in controlling the discharging of the battery cells.

According to a seventh aspect of the present teachings, the battery-side signal terminal(s) is (are) configured to transmit, to the power tool or the charger, one or more signals related to the temperature of the cells.

According to an eighth aspect of the present teachings, the charging-dedicated, battery-side signal terminal(s) is (are) configured to transmit, to the charger, one or more signals related to the voltage(s) of the (respective) battery cells.

According to a ninth aspect of the present teachings, a plurality of the charging-dedicated, battery-side (second) signal terminals is provided. In addition, the pair of battery-side, electric-power (plus and minus) terminals and the battery-side (first) signal terminal(s) are disposed between the charging-dedicated, battery-side signal terminals of the plurality of charging-dedicated, battery-side signal terminals. That is, the charging-dedicated, battery-side signal terminals are disposed on both outer sides in the direction that the terminals are disposed in parallel. Consequently, wiring and the like is simplified when, for example, guiding the voltage signals of the battery cells to the charging-dedicated, battery-side signal terminals.

According to a tenth aspect of the present teachings, terminal clips used in the pair of battery-side, electric-power terminals, the battery-side signal terminal, and the charging-dedicated, battery-side signal terminals are all formed with the same shape and size and are disposed equispaced in a direction orthogonal to the sliding direction. Consequently, the design is simple and a reduction in manufacturing costs can be achieved.

According to an eleventh aspect of the present teachings, the terminal clips are configured such that, on a first-end (side) in the sliding direction, a plate-shaped terminal (of the power tool or the charger) inserted in the sliding direction is sandwiched (squeezed) in the thickness direction of the plate and thereby the terminal clip is electrically connected to the plate-shaped terminal. Furthermore, each terminal clip is configured such that a width dimension (or a gap) on the first-end (side) in the sliding direction is smaller than a width dimension (or a gap) on a second-end (side) in the sliding direction. The first-end (side) and the second-end (side) of adjacent terminal clips alternate in the direction orthogonal to the sliding direction such that they are reversely oriented. In addition, the terminal clips are disposed in parallel in the direction orthogonal to the sliding direction. Consequently, the distance between adjacent terminals can be minimized while still preventing short circuits.

According to a twelfth aspect of the present teachings, the first-ends (sides), in the sliding direction, of the terminal clips are provided such that tips, in the sliding direction, of the plate-shaped terminals (of the pair of tool-side, power-supply terminals and the tool-side signal terminal of the power tool) electrically connect, simultaneously, to the first-ends (sides), in the sliding direction, of the terminal clips corresponding (complementary) to those plate-shaped terminals. Consequently, the length dimension, in the sliding direction, of the plate-shaped terminals that constitute each terminal of the pair of tool-side, power-supply terminals and the tool-side signal terminal can be set to the required minimum.

According to a thirteenth aspect of the present teachings, the first-ends (sides), in the sliding direction, of the terminal clips are provided such that tips, in the sliding direction, of the plate-shaped terminals (of the pair of charger-side, electric-power terminals and the charger-side signal terminal of the charger) electrically connect, simultaneously, to the first-ends (sides), in the sliding direction, of the terminal clips corresponding to those plate-shaped terminals. In this embodiment as well, the length dimension, in the sliding direction, of the plate-shaped terminals that constitute each terminal of the pair of charging-electric-power terminals and the charger-side signal terminal can be set to the required minimum.

According to a fourteenth aspect of the present teachings, each battery-side, electric-power (plus and minus) terminal of the pair of battery-side, electric-power terminals comprises two or more of the terminal clips aligned (disposed in parallel) in (along) the sliding direction. It is noted that, because the battery-side, electric-power terminals serve as electrically-conductive paths for the discharge current (the charging current), heat tends to be generated in the terminal clip(s). However, in the present aspect of the present teachings, the battery-side, electric-power terminals each comprise two or more of the terminal clips, and therefore the discharge current flows in a distributed manner to (through) the plurality of terminal clips, which makes it possible to reduce the generation of heat (or better disperse the generated heat) in the terminal clips so as to avoid overheating the terminal clips.

According to a fifteenth aspect of the present teachings, when the battery pack is mounted on the power tool, the tool-side, power-supply terminals of the power tool are mechanically connected to all of the two or more terminal clips, which are aligned (disposed in parallel) in (along) the sliding direction, of the battery-side, electric-power terminals. Consequently, the generation of heat in the terminal clips can be reduced (or the heat can be better dispersed and dissipated) even when the discharge current flowing to the power tool is large (e.g., 40 A or more).

According to a sixteenth aspect of the present teachings, when the battery pack is mounted on the charger, the charging-electric-power terminals of the charger are mechanically connected to one of the two or more terminal clips, which are aligned (disposed in parallel) in (along) the sliding direction, of the battery-side, electric-power terminals. It is noted that, generally speaking, the charging current may be much smaller than the discharge current flowing to the power tool. Therefore, not much heat is generated during a charging operation even with just one terminal clip. Thus, because each charging-electric-power terminal is mechanically connected to one terminal clip of the battery-side, electric-power terminals, the resistance can be reduced when connecting or disconnecting the charging-electric-power terminals and the battery-side, electric-power terminals.

According to a seventeenth aspect of the present teachings, each battery-side, electric-power (plus minus) terminal of the pair of battery-side, electric-power terminals comprises two of the terminal clips aligned (disposed in parallel) in (along) the sliding direction. Furthermore, these two terminal clips are disposed such that their first-ends (sides), which sandwich (squeeze or electrically contact) the plate-shaped terminals (of the power tool or the charge), oppose (are directly adjacent to) one another in the sliding direction. Consequently, by inserting the plate-shaped terminal through the first terminal clip until it reaches the first-end side of the second terminal clip, that plate-shaped terminal can be electrically connected to the two terminal clips. Accordingly, the insertion dimension (length) of the plate-shaped terminal can be set to the required minimum, and the length dimension of the plate-shaped terminal can be minimized.

According to an eighteenth aspect of the present teachings, the terminal clip(s) that constitutes the battery-side (first) signal terminal(s) is (are) disposed such that its first-end (side) and its second-end (side) are reversely oriented with respect to the terminal clips that constitute the pair of battery-side, electric-power (plus and minus) terminals.

According to a nineteenth aspect of the present teachings, the terminal clips that constitute the charging-dedicated, battery-side (second) signal terminals are disposed such that their first-ends (sides) and second-ends (sides) are reversely oriented with respect to the terminal clips that constitute the pair of battery-side, electric-power terminals.

According to a twentieth aspect of the present teachings, a protecting means is provided that protects an electrical circuit (within the battery pack) from a short circuit between the battery-side, electric-power terminals and the battery-side signal terminal when the pair of tool-side, power-supply terminals and the tool-side signal terminal of the power tool are connected to the pair of battery-side, electric-power terminals and the battery-side signal terminal or when disconnected. Consequently, the electrical circuit is protected by the action of the protecting means—even if a short circuit were to occur between the battery-side, electric-power terminals and the battery-side signal terminal.

According to a twenty-first aspect of the present teachings, a protecting means is provided that protects an electrical circuit (within the battery pack) from a short circuit between the battery-side, electric-power terminals and the battery-side signal terminal when the pair of charger-side, electric-power terminals and the charger-side signal terminals of the charger are connected to the pair of battery-side, electric-power terminals, the battery-side signal terminal and the charging-dedicated, battery-side signal terminal or when disconnected. Consequently, the electrical circuit is protected by the action of the protecting means—even if a short circuit were to occur between the battery-side, electric-power terminals and the battery-side signal terminal.

Thus, it is possible to design battery packs according to the present teachings so that the battery-mounting part of the power tool can be made more compact (narrower) in the width (lateral) direction of the power tool.

DETAILED DESCRIPTION OF EMBODIMENTS OF THE PRESENT TEACHINGS

First Embodiment

Figure 1:
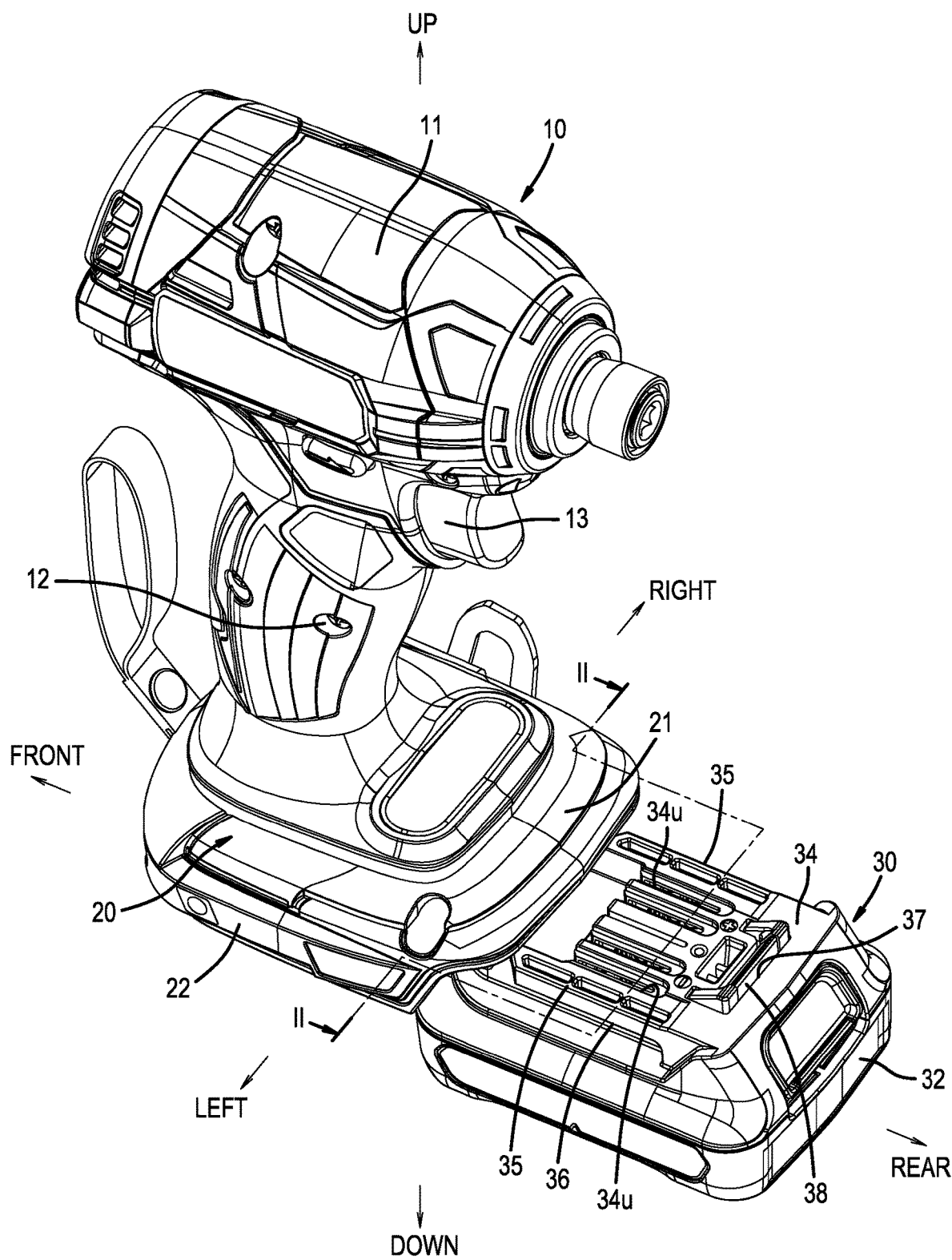
FIG. 1 is an oblique view that shows a battery pack and a power tool, whereto the battery pack is coupled, according to a first embodiment of the present teachings.

A battery pack according to a first embodiment of the present teachings will be explained below, with reference to FIG. 1 to FIG. 18. Such a representative, not limiting battery pack 30 preferably serves as a drive-power supply of a power tool 10 and is configured such that it can be slid onto and thereby connected (both physically and electrically) to a battery-mounting part 20 of the power tool 10. In addition, the battery pack 30 is configured such that battery cells 31 can be charged (recharged) by sliding the battery pack 30 onto and thereby connecting it to a battery-mounting part 52 of a charger 50. Furthermore, the directions front, rear, left, right, up, and down denoted in the drawings correspond to front, rear, left, right, up, and down using the sliding direction of the battery pack 30 relative to the tool body as a reference.

Overview of a Representative Power Tool 10

Figure 2:
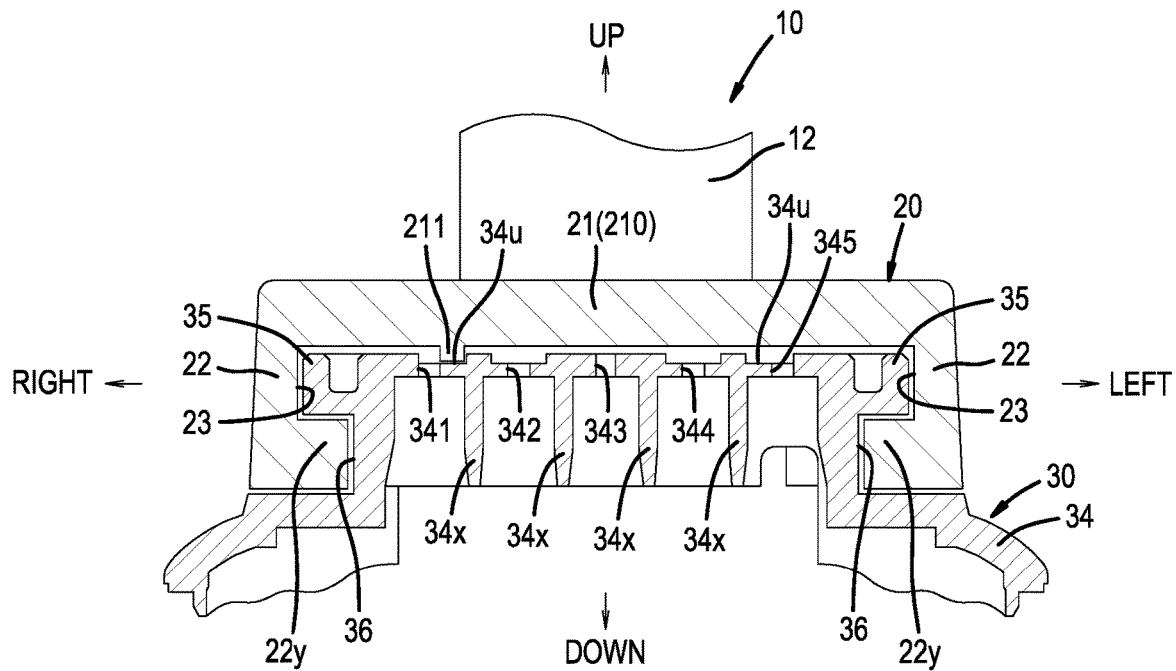
FIG. 2 is a cross-sectional view taken along line (II)-(II) in FIG. 1.

Before explaining the battery pack 30 in greater detail, an overview of the representative, non-limiting power tool 10 will first be provided. The representative power tool 10 shown in FIG. 1 is an impact driver. The power tool 10 generally comprises a tubular housing-main-body part 11, which accommodates a motor 10m (refer to FIG. 6), etc., and a grip part 12, which is provided such that it protrudes downward from a lower surface of the housing-main-body part 11. Furthermore, the battery-mounting part 20, whereto the battery pack 30 couples, is provided at a lower-end position of the grip part 12. As shown in FIG. 1 and FIG. 2, the battery-mounting part 20 is formed into a rectangular-cover shape that widens in a width direction (a left-right direction) and frontward with respect to the grip part 12. Wall-shaped vertical-wall parts 22, which protrude downward, are provided on both the left and right sides and on a rear end side of a cover-ceiling part 21. Furthermore, as shown in FIG. 2, rectangular projections (flanges) 22y, which protrude from inner sides, are formed at lower-end positions of the vertical-wall parts 22, which are located on both the left and right sides of the battery-mounting part 20, such that they extend in a front-rear direction (the sliding direction). Thereby, slide mechanisms (e.g., grooves) 23, which extend in the front-rear direction, are formed between the cover-ceiling part 21 and the rectangular projections 22y of the battery-mounting part 20.

Furthermore, as shown in FIG. 2, left and right sliding rails 35 of the battery pack 30 (described below) mate (slidably engage) with the left and right slide mechanisms 23 of the power tool 10 (the battery-mounting part 20). Similarly, left and right slide mechanisms (e.g., grooves) 36 of the battery pack 30 mate (slidably engage) with the left and right rectangular projections 22y of the battery-mounting part 20. In addition, a misinsertion-prevention projection 211, which extends in the front-rear direction (the sliding direction), is formed at a location toward the right in the lower surface of the cover-ceiling part 21 (a terminal-support plate 210) of the power tool 10 (the battery-mounting part 20). Furthermore, insertion-permitting rectangular grooves 34u, whereto the misinsertion-prevention projections 211 mate, are formed, on the inner sides of the right and left slide rails 35 of the battery pack 30 in the width direction such that they extend in the front-rear direction, at locations corresponding to the misinsertion-prevention projections 211 of the power tool 10 (the battery-mounting part 20).

Figure 3:
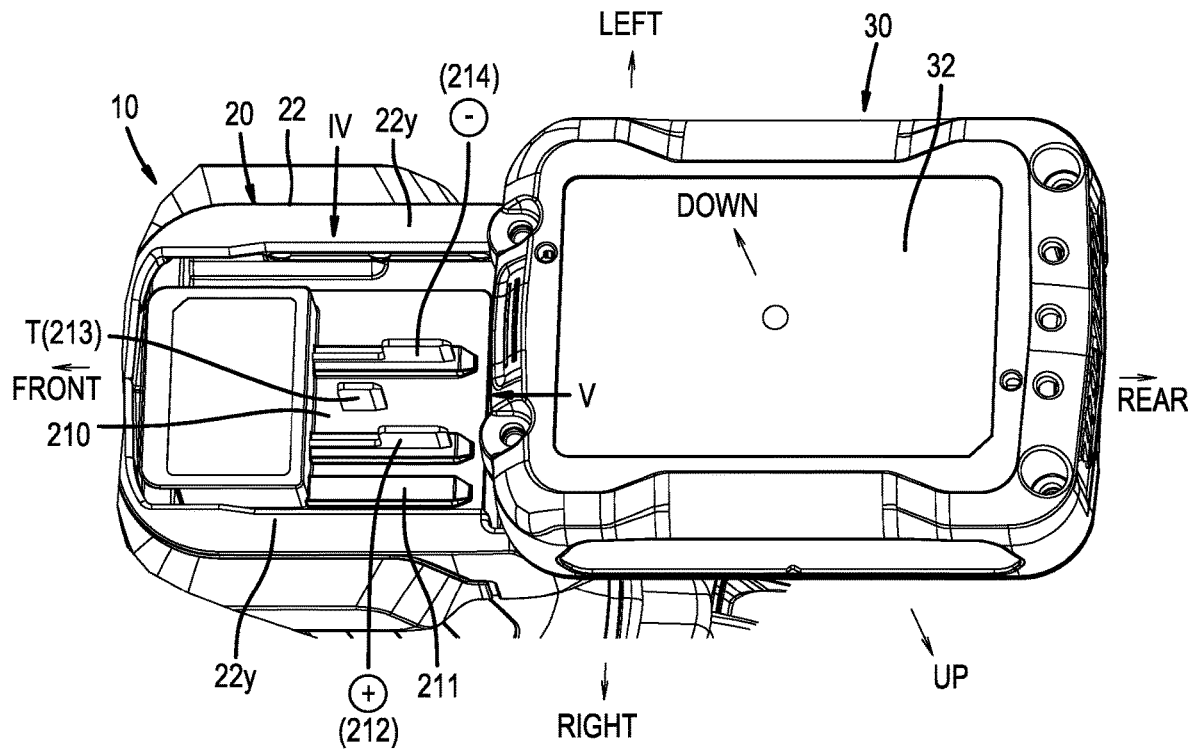
FIG. 3 is an oblique view, as viewed from below, of the battery pack and the power tool, whereto the battery pack is coupled.
Figure 4:
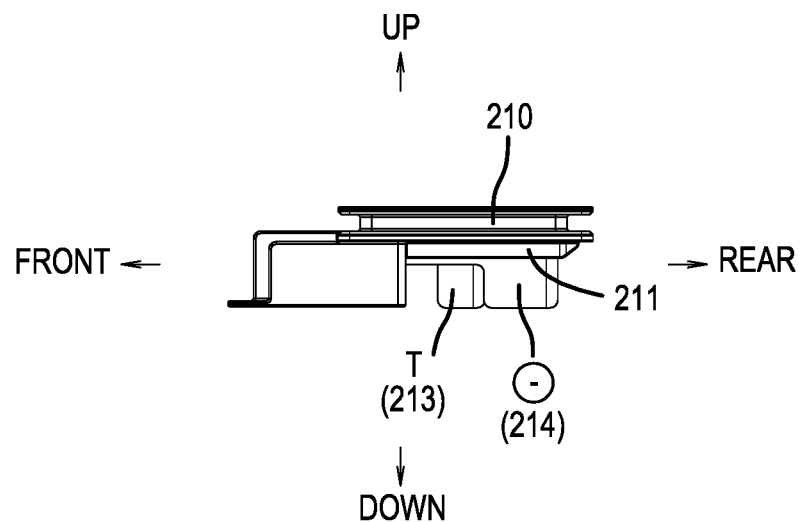
FIG. 4 is a side view (taken in the IV arrow direction in FIG. 3) that shows terminals in a battery-mounting part of the power tool.
Figure 5:
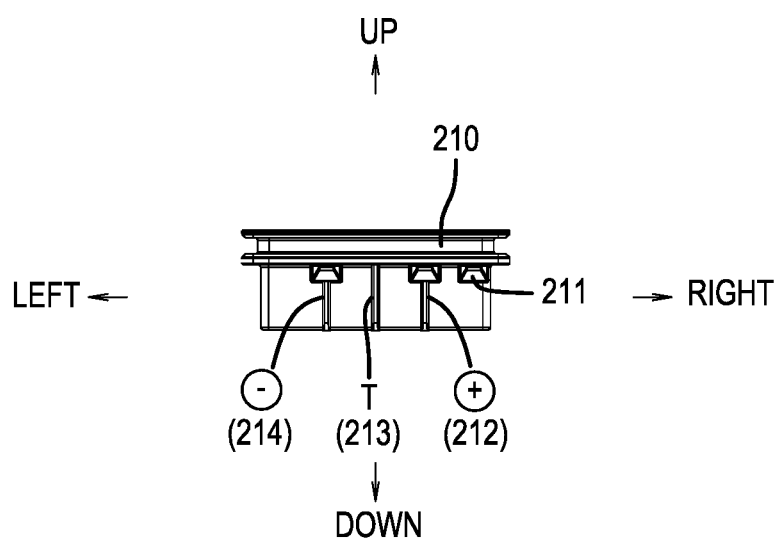
FIG. 5 is a front view (taken in the V arrow direction in FIG. 3) that also shows the terminals in the battery-mounting part of the power tool from a different direction perpendicular to the view shown in FIG. 4.

As shown in FIG. 3 to FIG. 5, the terminal-support plate 210 is fixed to the lower surface of the cover-ceiling part 21 of the power tool 10 (the battery-mounting part 20). Furthermore, the above-mentioned misinsertion-prevention projections 211, a positive terminal 212 (+), a negative terminal 214 (−), and a temperature-signal terminal 213 (T) are provided on the terminal-support plate 210. The positive terminal 212 (+), the negative terminal 214 (−), and the temperature-signal terminal 213 (T) are plate-shaped (planar) terminals that are provided such that they extend in the sliding direction in a vertically oriented state. In addition, spacings in a direction orthogonal to the sliding direction of the positive terminal 212 (+), the negative terminal 214 (−), and the temperature-signal terminal 213 (T) are set as the minimum spacings needed to prevent a short circuit, as will be further discussed below.

Figure 6:
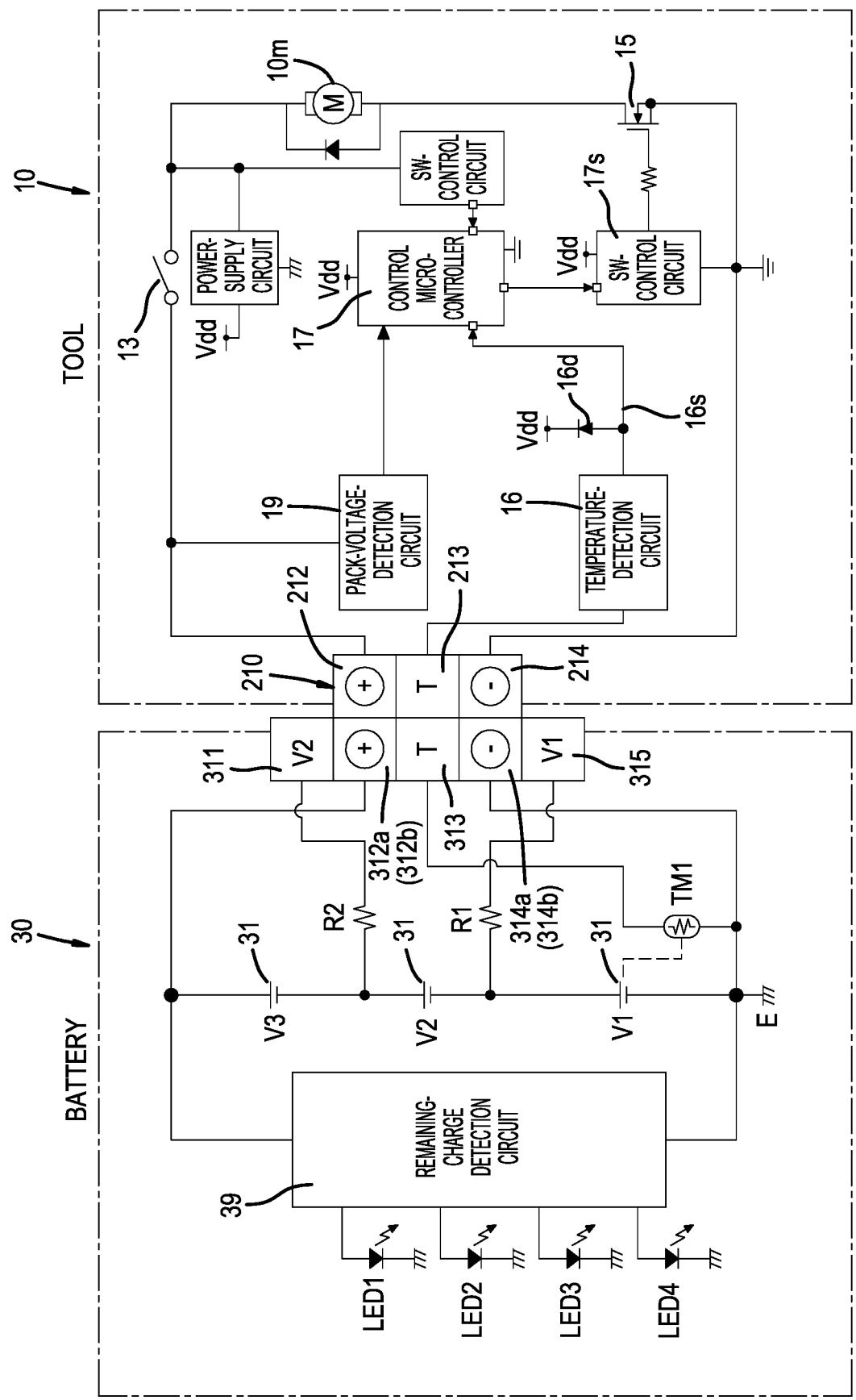
FIG. 6 is an electric circuit diagram that shows the battery pack electrically coupled to the power tool.

As shown in FIG. 6, the positive terminal 212 (+) is electrically connected to a positive terminal of the motor 10m via a main switch (e.g., micro switch) 13 of the power tool 10. In addition, the negative terminal 214 (−) is electrically connected to a negative terminal of the motor 10m via a switching device (e.g., a power FET) 15. Furthermore, the temperature-signal terminal 213 (T) is connected to a temperature-detection circuit 16, and an output signal of the temperature-detection circuit 16 is input to a control microcontroller 17. That is, the positive terminal 212 (+) and the negative terminal 214 (−) of the power tool 10 each correspond to a tool-side, power-supply (corresponding plus or minus) terminal of the present teachings, and the temperature-signal terminal 213 (T) corresponds to a tool-side (corresponding first) signal terminal of the present teachings.

When a voltage value detected by a pack-voltage-detection circuit 19 (refer to FIG. 6) becomes less than a predetermined value (threshold), the control microcontroller 17 of the power tool 10 stops the motor 10m by outputting a stop signal to an SW-control (switch control, e.g., pulse width modulation) circuit 17s, which then continuously opens (disconnects) the switching device 15 so that no current is supplied to the motor 10m. In addition, if a temperature value detected by the temperature-detection circuit 16 exceeds a permissible range, then the control microcontroller 17 stops the motor 10m by outputting the stop signal to the SW-control circuit 17s, which then continuously opens (disconnects) the switching device 15. Thereby, it is possible to prevent the battery pack 30 from overcharging, or reaching a high temperature, which can lead to a reduction in the service life of the battery cells in the battery pack 30.

In addition, a diode 16d is provided between the temperature-detection circuit 16 and the control microcontroller 17 of the power tool 10 and serves to protect the microcontroller 17. In the state shown in FIG. 6, the diode 16d acts to protect the control microcontroller 17 in case a short circuit were to occur between the positive terminal 212 (+) and the temperature-signal terminal 213 (T), which would cause the battery voltage (battery voltage>Vdd) to be applied to an output-signal line 16s of the temperature-detection circuit 16. That is, the diode 16d is configured (selected) such that, if the (full) battery voltage is applied to the output-signal line 16s of the temperature-detection circuit 16, then that battery voltage is discharged to the power supply (Vdd) side of the control microcontroller 17. As a result, the battery voltage is no longer applied to the signal terminal of the control microcontroller 17, thereby protecting the control microcontroller 17.

In addition, if a short circuit occurs between the positive terminal 212 (+) and the temperature-signal terminal 213 (T), then the output voltage of the temperature-detection circuit 16 becomes a maximum value (Hi [power supply voltage Vdd]) by the action of the diode 16d. As a result, the control microcontroller 17 would (in case it is not protected from the short circuit) determine that the temperature of the cells 31 of the battery pack 30 is lower than a permissible temperature, and would output the stop signal (a motor-stop signal) for the switching device 15 to the SW-control circuit 17s. In addition, if a short circuit occurs between the temperature-signal terminal 213 (T) and the negative terminal 214 (−), the voltage (the output voltage) of the output-signal line 16s of the temperature-detection circuit 16 becomes a minimum value (Low (0 V)). As a result, the control microcontroller 17 would (again, in case it is not protected from the short circuit) determine that the temperature of the cells 31 of the battery pack 30 is higher than a permissible temperature, and would output the stop signal (the motor-stop signal) for the switching device 15 to the SW-control circuit 17s. Furthermore, instead of the diode 16d, it is also possible to provide a Zener diode, having a breakdown voltage in accordance with the voltage (less than the rated voltage) of the control microcontroller 17, between the output-signal terminal 16s and a ground terminal.

Battery Pack 30

The battery pack 30 of the present embodiment is a low-output battery (for tools having a current rating of 20 A) that supplies electric power (current) to the power tool 10. As shown in FIG. 7 to FIG. 11, the battery pack 30 comprises an upper-part-open type housing-main-body part (lower case) 32, which stores (accommodates) a plurality of battery cells 31 (refer to FIG. 11), and a cover part (upper case) 34, which closes up an upper-part opening 32h of the housing-main-body part (lower case) 32.

Cover Part 34 of Battery Pack 30

Figure 7:
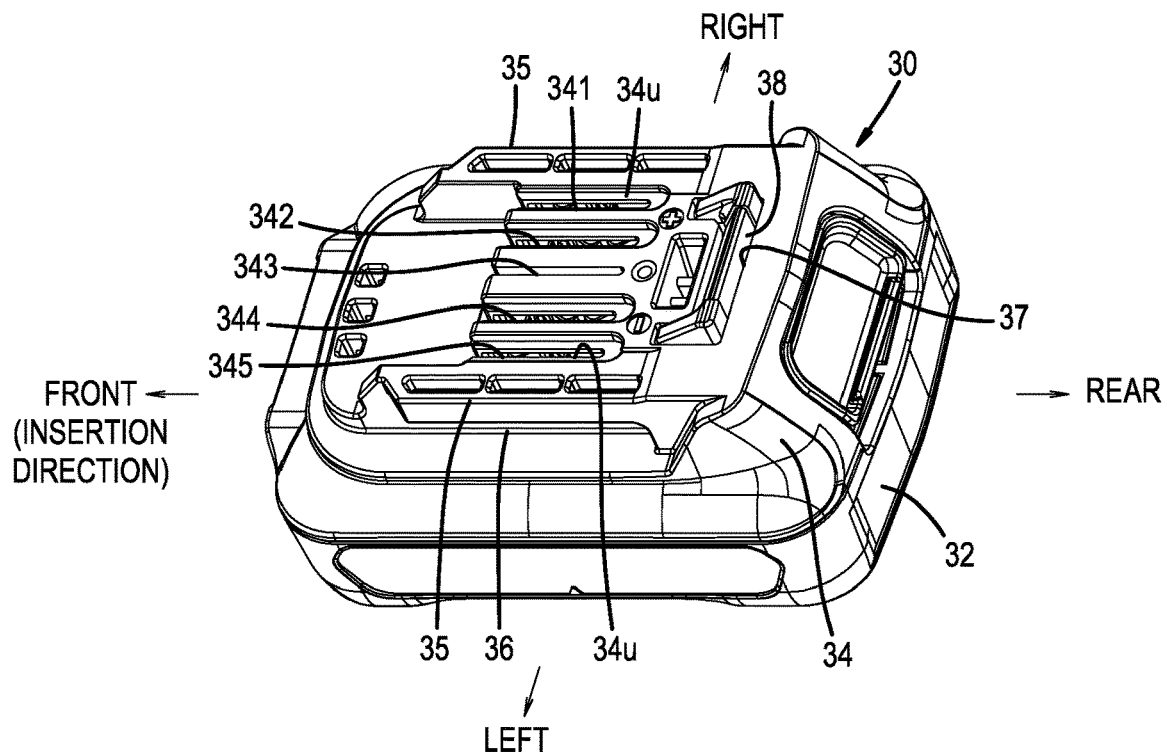
FIG. 7 is an oblique view of the battery pack.
Figure 9:
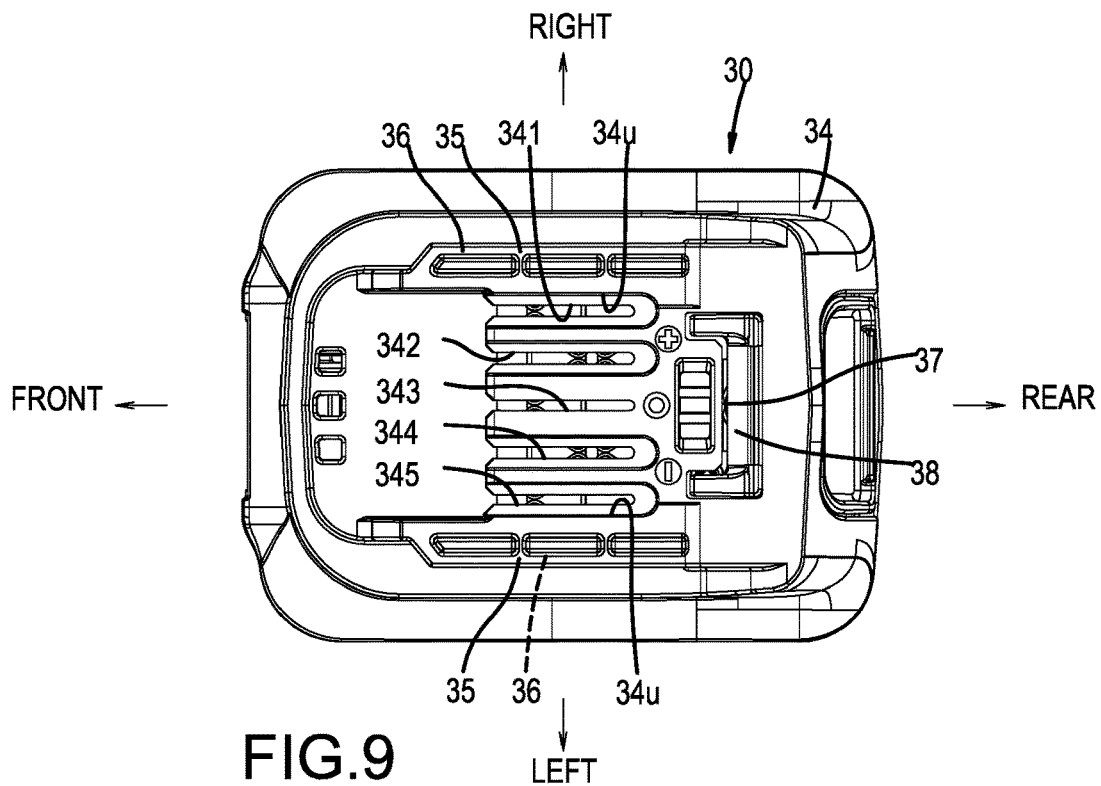
FIG. 9 is a top view of the battery pack.
Figure 16:
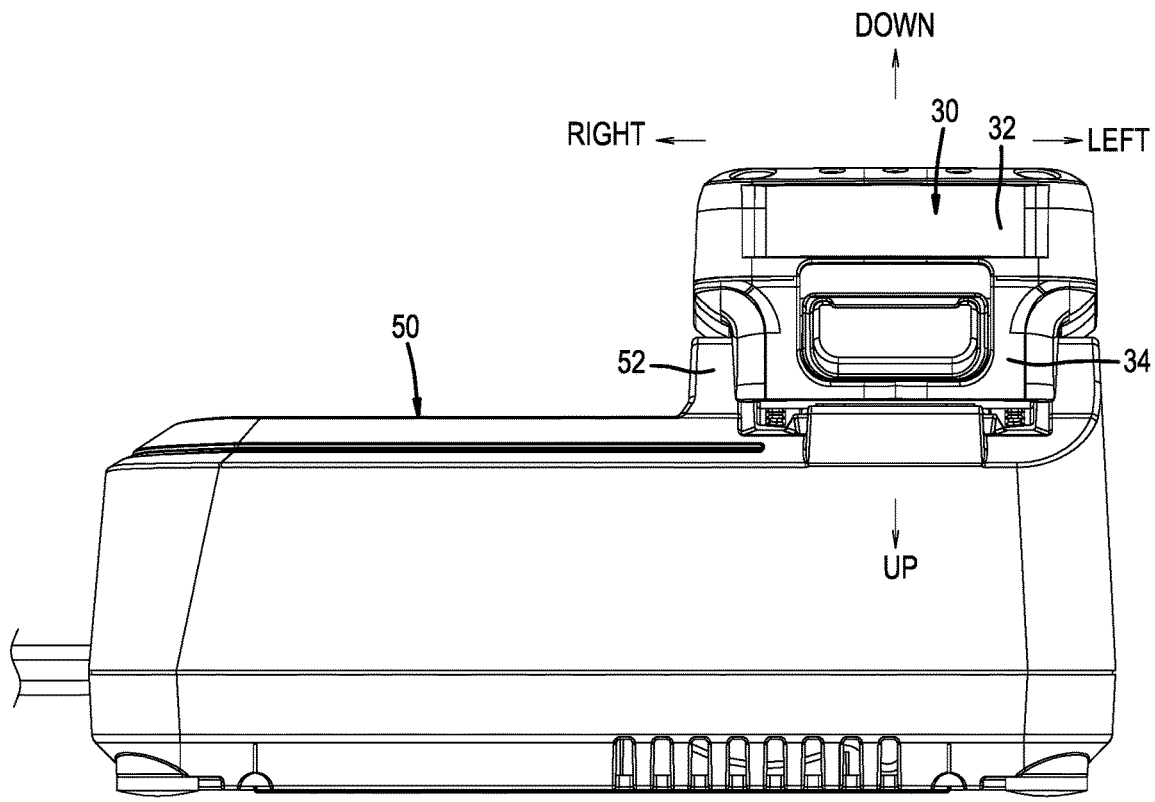
FIG. 16 is a side view that shows the battery pack coupled to the charger.

The cover part (upper case) 34 of the battery pack 30 is configured such that the battery pack 30 can be slid onto and thereby connected to the battery-mounting part 20 of the power tool 10 or to the battery-mounting part 52 of the charger 50 (refer to FIG. 16). That is, as shown in FIG. 2, FIG. 7, and FIG. 9, the sliding rails 35, which are capable of mating (slidably engaging) with the left and right slide mechanisms 23 of the power tool 10 (the battery-mounting part 20), are formed, extending in the front-rear direction (the sliding direction), on both the left and right sides of an upper surface of the cover part 34 of the battery pack 30. In addition, the slide mechanisms 36, whereto the left and right rectangular projections 22y of the power tool 10 (the battery-mounting part 20) mate, are formed on the lower sides of the left and right sliding rails 35.

As shown, e.g., in FIG. 7, FIG. 9, first to fifth slits 341, 342, 343, 344, 345, into which the terminals 212, 213, 214 of the power tool 10 or terminals 511, 512, 513, 514, 515 of the charger 50 (described later) are slidably inserted, are formed between the left and right sliding rails 35 in the upper surface of the cover part 34 of the battery pack 30. Furthermore, the above-mentioned insertion-permitting rectangular grooves 34u are formed at perimetric edges of the first slit 341 and the fifth slit 345. In addition, a hook opening 37, whose flat surface shape is a horizontal U shape, is formed rearward of the first to fifth slits 341, 342, 343, 344, 345 in the upper surface of the cover part 34 of the battery pack 30. Furthermore, a hook 38 is shaped and biased such that it protrudes from the hook opening 37 by a predetermined amount owing to the biasing force of a spring. The hook 38 is configured such that, when the battery pack 30 has been slid onto and thereby connected to the battery-mounting part 20 of the power tool 10 or the battery-mounting part 52 of the charger 50, it is capable of mating (latching) with a slide-lock groove (not shown) on the power tool 10 side or a slide-lock groove (not shown) on the charger 50 side.

Internal Structure of Battery Pack 30

Figure 8:
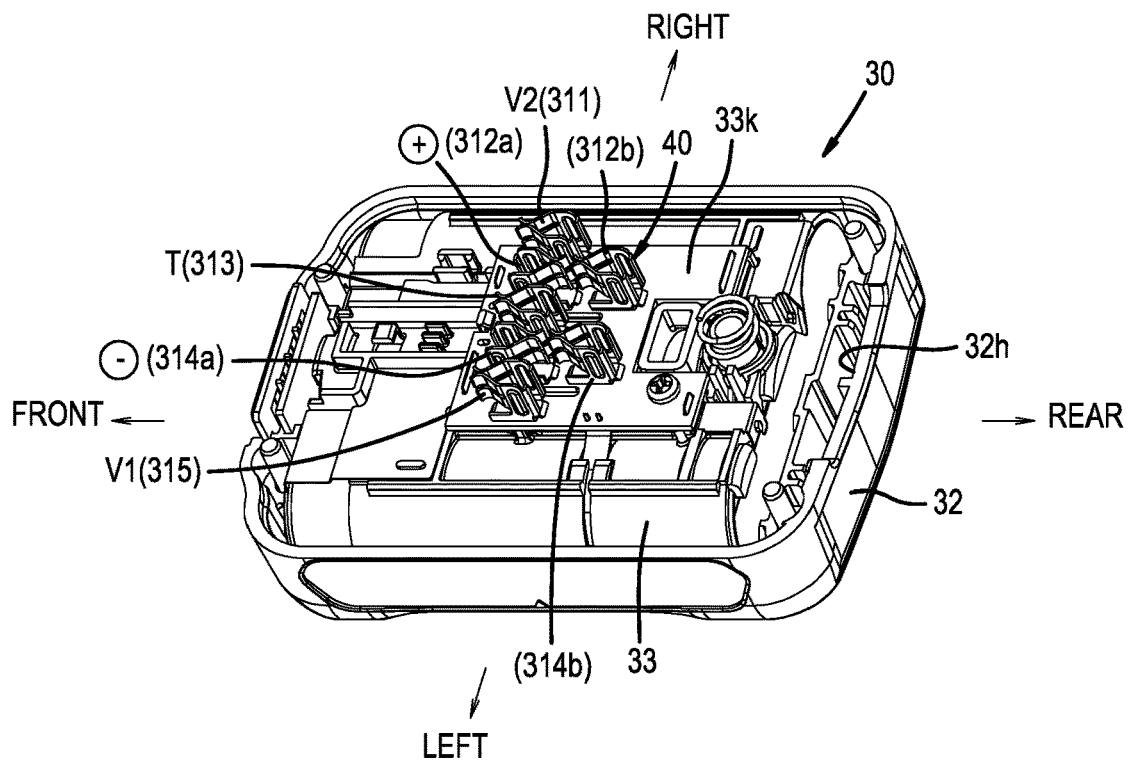
FIG. 8 is an oblique view of the battery pack of FIG. 7 with a cover part (cover) removed.
Figure 10:
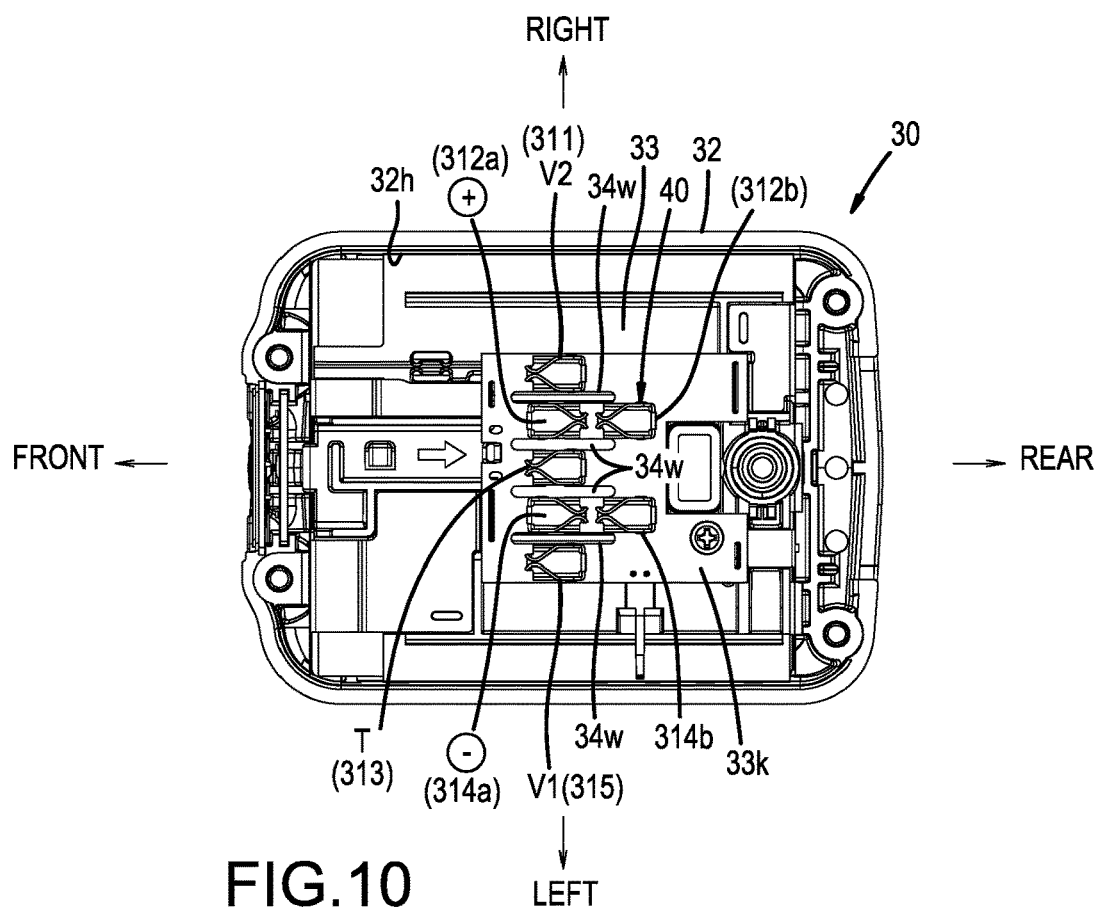
FIG. 10 is a top view of the battery pack of FIG. 7 with the cover part (cover) removed.
Figure 11:
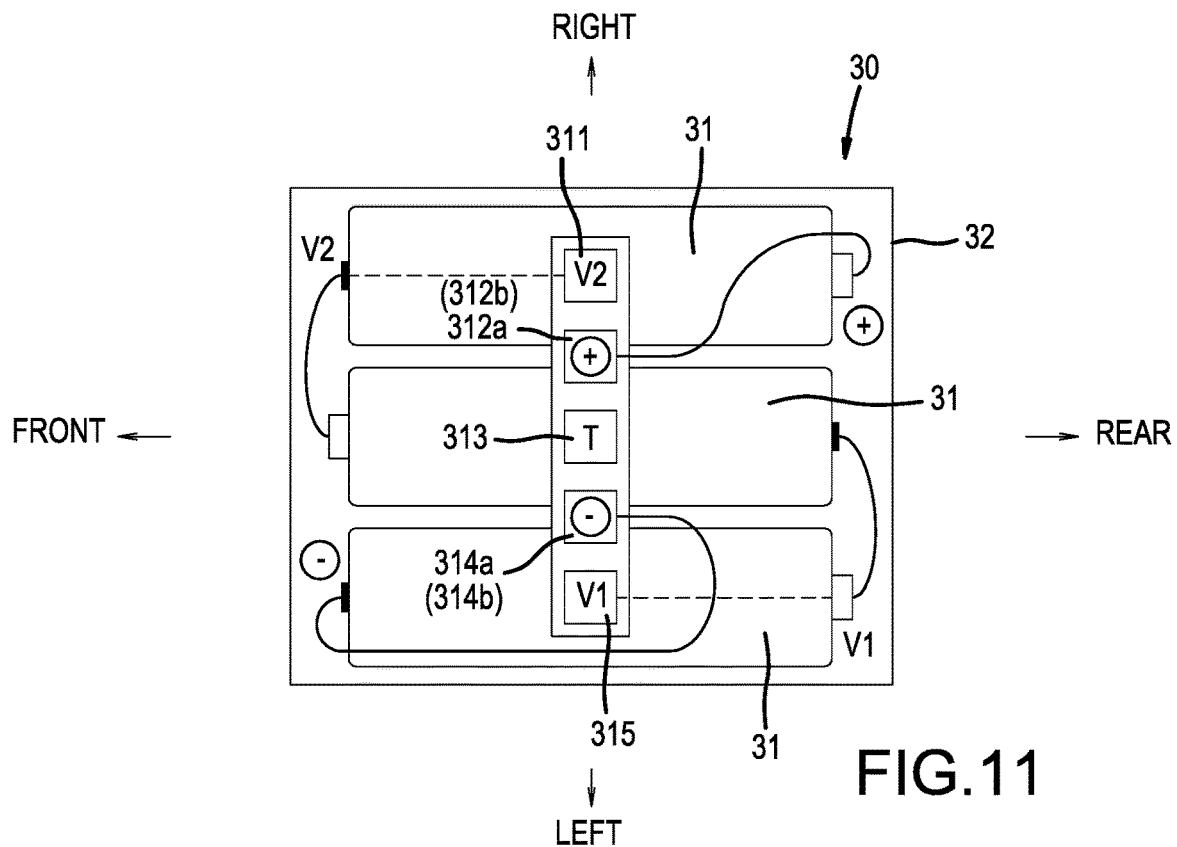
FIG. 11 is a schematic drawing that shows a layout of battery cells in the battery pack and shows electrical connections between the battery cells and terminals.

As shown in the schematic drawing of FIG. 11, for example, three circular-cylindrical (columnar) battery cells 31 are stored in an interior of the housing-main-body part 32 of the battery pack 30 such that the cells 31 are electrically connected in series, an axial centerline of each cell 31 is aligned in the front-rear direction (the sliding direction), and the cells 31 are disposed in parallel in the left-right direction. As shown, e.g., in FIG. 8, the cells 31 are held on the housing-main-body part 32 by a cell holder 33, and an electrical circuit board 33k is fixed to the upper surface of the cell holder 33 at the center thereof. As shown in FIG. 8 and FIG. 10, a V2 terminal 311, positive terminals 312a, 312b (+), a temperature-signal terminal 313 (T), negative terminals 314a, 314b (−), and a V1 terminal 315 are provided on the electrical circuit board 33k at locations corresponding to the first to fifth slits 341, 342, 343, 344, 345, respectively, of the cover part 34.

The positive terminals 312a, 312b (+) of the battery pack 30 are electrically connected to a positive electrode V3 of the series-connected cells 31, as shown in FIG. 6. The negative terminals 314a, 314b (−) are electrically connected to a negative electrode (ground E) of the series-connected cells 31. The positive terminals 312a, 312b (+) and the negative terminals 314a, 314b (−) are configured such that they supply electric power (current) to the motor 10m of the power tool 10 and such that they are capable of transmitting a positive-voltage signal of the series-connected cells 31 to the pack-voltage-detection circuit 19 of the power tool 10. In addition, the temperature-signal terminal 313 (T) is electrically connected to one of the two terminals of a thermistor TM1, which is configured to measure the temperature of the cells 31. In addition, the other terminal of the thermistor TM1 is electrically connected to the ground terminal E. The temperature-signal terminal 313 (T) is configured such that it is capable of transmitting a resistance value signal of the thermistor TM1 to the temperature-detection circuit 16 of the power tool 10.

Thus, the temperature-signal terminal 313 (T) of the battery pack 30 is electrically connected to the ground terminal E via the thermistor TM1. Consequently, if a short circuit were to occur between the positive terminals 312a, 312b (+) and the temperature-signal terminal 313 (T) when the battery pack 30 is not connected to the power tool 10, then the voltage (the battery voltage) of the positive terminals 312a, 312b (+) would be applied to the ground terminal E via the thermistor TM1 (a resistor). In this case, a short-circuit current would flow to the thermistor TM1. However, the electric current that flows through the thermistor TM1 itself will generate heat, and thereby its resistance value will increase. As a result, even if a short circuit were to occur between the positive terminals 312a, 312b (+) and the temperature-signal terminal 313 (T), the short-circuit current from the thermistor TM1 will be kept to a small value. Furthermore, if a short circuit occurs between the negative terminals 314a, 314b (−) and the temperature-signal terminal 313 (T), then a zero voltage (0 V) will be applied to the temperature-signal terminal 313 (T), and consequently no particular problem will arise. Therefore, the thermistor TM1 can serve as one representative, non-limiting example of a protecting means according to the present teachings.

The V2 terminal 311 of the battery pack 30 is electrically connected to a positive electrode V2 of the second of the series-connected cells 31 (i.e. the middle cell 31) via a resistor (resistance) R2. The V1 terminal 315 is electrically connected to a positive electrode V1 of the first cell 31 (bottommost cell in FIG. 6) via a resistor (resistance) R1. In addition, as shown in FIG. 6, the positive electrode V3 of the series-connected cells 31 and the negative electrode E (the ground terminal) are electrically connected to a remaining-charge-detection circuit 39. The remaining-charge-detection circuit 39 is a circuit that, based on the combined (total) voltage of all of the series-connected battery cells 31, detects the remaining capacity of the battery pack 30 and is configured such that it can turn on (illuminate) one or more of LED1-LED4 in accordance with the remaining capacity.

As shown in FIG. 6 to FIG. 11, the positive terminals 312a, 312b (+), the temperature-signal terminal 313 (T), and the negative terminals 314a, 314b (−) of the battery pack 30 are adjacently disposed in parallel in a direction orthogonal to the sliding direction, and spacings therebetween are set to the minimum values necessary to prevent short circuits therebetween. That is, the temperature-signal terminal 313 (T) is disposed between the positive terminals 312a, 312b (+) and the negative terminals 314a, 314b (−) in the left-right direction of the battery pack 30. In addition, the V2 terminal 311 and the V1 terminal 315 are disposed at outer positions in the left-right direction of the battery pack 30 (the vertical direction in FIG. 6) such that they sandwich, from the right side and the left side, the positive terminals 312a, 312b (+), the temperature-signal terminal 313 (T), and the negative terminals 314a, 314b (−), i.e. the latter terminals are disposed between the V2 terminal 311 and the V1 terminal 315. As shown in FIG. 11, the positive electrode V2 (including a conductor) of the second (middle) cell 31 is provided on the right side of the housing-main-body part 32. Consequently, the distance between the positive electrode V2 of the second (middle) cell 31 and the V2 terminal 311 disposed on the right end becomes small, and thereby the wiring length between them can be shortened. In addition, the positive electrode V1 of the first (bottommost in FIG. 6) cell 31 is provided on the left side of the housing-main-body part 32. Consequently, the distance between the positive electrode V1 of the first (bottommost) cell 31 and the V1 terminal 315 disposed on the left end becomes small, and thereby the wiring length between them can be shortened.

Terminal Clips 40 of Battery Pack 30

Next, terminal clips (clamps or clasps) 40, which may be used as the positive terminals 312a, 312b (+), the negative terminals 314a, 314b (−), the temperature-signal terminal 313 (T), the V2 terminal 311, and the V1 terminal 315 of the battery pack 30, will be explained. The terminal clips 40 are preferably all formed with the same shape and size, but the present teachings are not limited to such embodiments and one or more of the above-noted terminals may have a different design. The terminal clips 40 are configured such that they can be electrically connected to the plate-shaped (planar) terminals (hereinbelow, called terminals) of the power tool 10 and the charger 50 (described later) by inserting those terminals in or along the sliding direction, as shown by white arrows in FIG. 10 and FIG. 12. Each terminal clip 40 comprises a base part 41, which has an oblong shape that is elongated in the sliding direction, vertical-wall parts 43, which are provided on both the left and right sides of the base part 41, and spring-plate parts (first end) 45, which are linked/connected (fixed) to the left and right vertical-wall parts 43 (second end).

Figure 12:
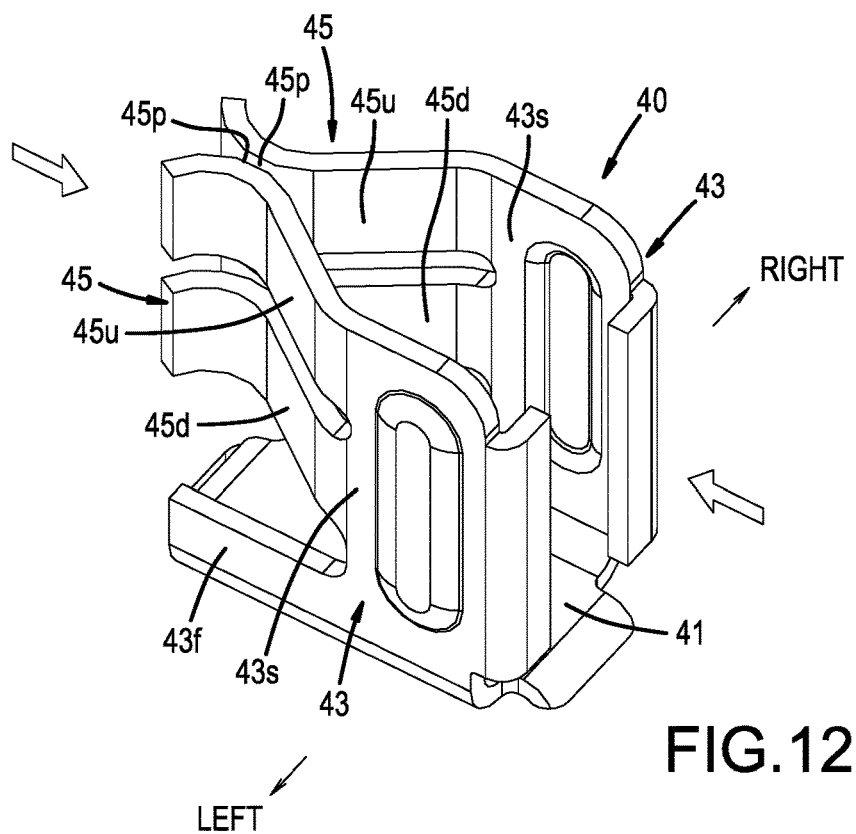
FIG. 12 is an oblique view that shows a terminal clip (or terminal clamp) of the battery pack.
Figure 13:
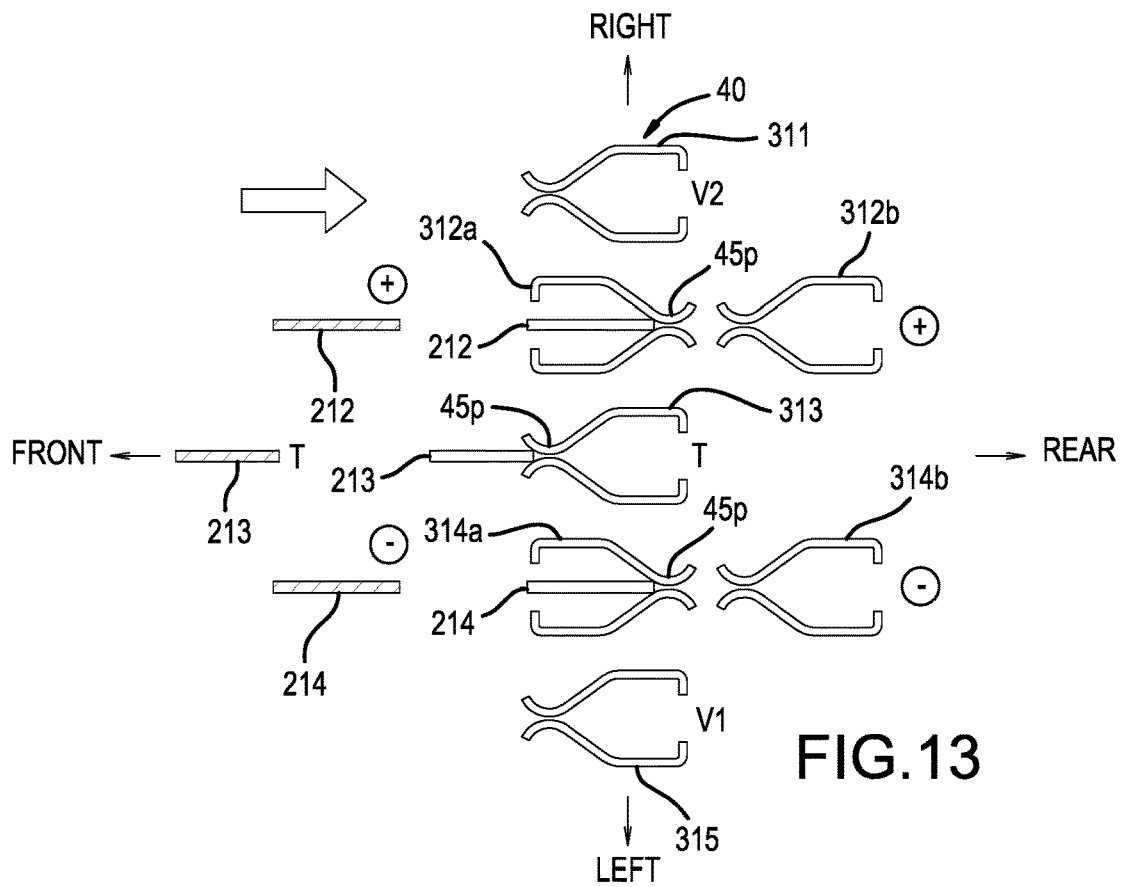
FIG. 13 is a plan view that shows a state before the connection is made between the terminals of the power tool and the terminal clips of the battery pack.

Each vertical-wall part 43 of each terminal clip 40 is formed in substantially an L shape in a side view, comprises a low foundation-wall part 43f provided on a tip side and a high fixed-wall part 43s provided on a base-end part side. Each spring-plate part 45 is provided such that it extends in the tip direction from the tip side of the corresponding fixed-wall part 43s in a state wherein the corresponding spring-plate part 45 is transversely oriented. Each spring-plate part 45 comprises a strip-shaped upper-plate part 45u and a strip-shaped lower-plate part 45d, both of which are bent, with respect to the fixed-wall parts 43s, toward the inner side in the width direction. In addition, a terminal-pressing surface 45p (first end), which is capable of pressing a side surface of the terminal, is provided at a tip part of each upper-plate part 45u and each lower-plate part 45d of the spring-plate part 45. That is, the spring-plate part 45 on the left side is biased such that it generates a pressing force in the right direction, and the spring-plate part 45 on the right side is biased such that it generates a pressing force in the left direction. Consequently, as shown in FIG. 12, when no terminal is inserted into the terminal clip 40, the terminal-pressing surface 45p of the spring-plate part 45 (the upper-plate part 45u and the lower-plate part 45d) on the left side and the terminal-pressing surface 45p of the spring-plate part 45 on the right side make surface contact with one another. Accordingly, the width dimension on the tip side (a first-end or first side) of the terminal clip 40 is smaller than the width dimension on the base-end part side (a second-end or second side).

As shown in FIG. 8 and FIG. 10, the positive terminals 312a, 312b (+) of the battery pack 30 are composed of two of the terminal clips 40 aligned (disposed in parallel) in the sliding direction, and the negative terminals 314a, 314b (−) of the battery pack 30 are composed of two of the terminal clips 40 aligned (disposed in parallel) in the sliding direction. In each case, the two terminal clips 40 are configured such that their tip sides (the first-ends or first sides) oppose (are directly adjacent to) one another in the sliding direction. That is, the terminal clip 40 on the front side is configured such that its tip side (the first-end or first side) faces rearward, and the terminal clip 40 on the rear side is configured such that its tip side (the first-end or first side) faces frontward. Consequently, for example, the power tool (planar) terminal passes through the terminal clip 40 on the front side and, at the stage when it reaches the terminal-pressing surface 45p (the tip part) of the terminal clip 40 on the rear side, an electrical connection is completed between the power tool (planar) terminal and the two terminal clips 40. Accordingly, the length dimension of the power tool (planar) terminal in the sliding direction can be minimized due to the close proximity of the terminal-pressing surfaces (first ends) 45p of the front and rear terminal clips 40.

The temperature-signal terminal 313 (T), the V2 terminal 311, and the V1 terminal 315 of the battery pack 30 are each composed of one of the terminal clips 40. The terminal clips 40 that constitute the temperature-signal terminal 313 (T), the V2 terminal 311, and the V1 terminal 315 are configured such that their tip sides (the first-ends or first sides) face frontward in a state wherein the front side terminal clips 40 of the positive terminals 312a, 312b (+) and the negative terminals 314a, 314b (−) are transversely aligned (disposed in parallel).

As shown, e.g., in FIG. 8 and FIG. 10, the terminal clips 40 of the positive terminals 312a, 312b (+) are disposed second from the right, and the terminal clips 40 of the negative terminals 314a, 314b (−) are disposed fourth from the right. Consequently, these terminal clips 40 are disposed in parallel (aligned) in the left-right direction in a state wherein the tip sides (the first-ends or first sides) and the base-end part sides (the second-ends or second sides) of adjacent terminal clips 40 alternate such that they are reversely oriented. Consequently, the gaps between adjacent terminal clips 40 can be minimized. In the present embodiment, the terminal clips 40 are disposed in parallel in the left-right direction in an equispaced manner and are configured, as shown in FIG. 2, such that insulating plates 34x, which are provided on the cover part 34 side of the battery pack 30, are respectively inserted in the gaps between adjacent terminal clips 40.

In addition, as shown in FIG. 10, slit-shaped drain holes 34w are formed in the electrical circuit board 33k at the locations of the gaps between adjacent terminal clips 40. Furthermore, the positive terminals 312a, 312b (+), the negative terminals 314a, 314b (−), and the temperature-signal terminal 313 (T), whereto the terminals 212, 213, 214 of the power tool 10 are respectively connected, are disposed together in a center part. Consequently, the width dimension of the battery-mounting part 20 of the power tool 10 can be minimized.

Slide Connection Between the Battery Pack 30 and the Power Tool 10

If the battery pack 30 is slid onto and thereby connected to the battery-mounting part 20 of the power tool 10, then, as shown in FIG. 1, the left and right sliding rails 35 of the battery pack 30 are caused to mate (slidably engage), from their front-end sides, with the left and right slide mechanisms 23 of the power tool 10 (the battery-mounting part 20). As a result, the slide mechanisms 36 of the battery pack 30 and the rectangular projections 22y of the power tool 10 (the battery-mounting part 20) mate (slidably engage) with one another. In this engaged state, the battery pack 30 can be slid frontward onto the battery-mounting part 20 of the power tool 10. Because the misinsertion-prevention projections 211 provided on the power tool 10 (the battery-mounting part 20) are inserted into the insertion-permitting rectangular grooves 34u of the battery pack 30, sliding of the battery pack 30 in the forward direction is not hindered.

Furthermore, in the sliding process, the terminals 212 (+), 213 (T), 214 (−) of the power tool 10 (the battery-mounting part 20) are respectively inserted into the second to fourth slits 342, 343, 344 (refer to FIG. 7) of the battery pack 30. Furthermore, as shown in chain double-dashed lines in FIG. 13, the terminals 212 (+), 213 (T), 214 (−) of the power tool 10 simultaneously make contact with the terminal-pressing surfaces 45p of the terminals 312a (+), 313 (T), 314a (−) (the terminal clips 40), respectively, of the battery pack 30. That is, the terminals 212 (+), 213 (T), 214 (−) of the power tool 10 are positionally set (positioned or located) in the sliding direction such that they simultaneously make contact with the terminal-pressing surfaces 45p of the corresponding terminal clips 40 during the sliding process. Therefore, the length dimension in the sliding direction of the terminals 212 (+), 213 (T), 214 (−) of the power tool 10 can be minimized.

Figure 14:
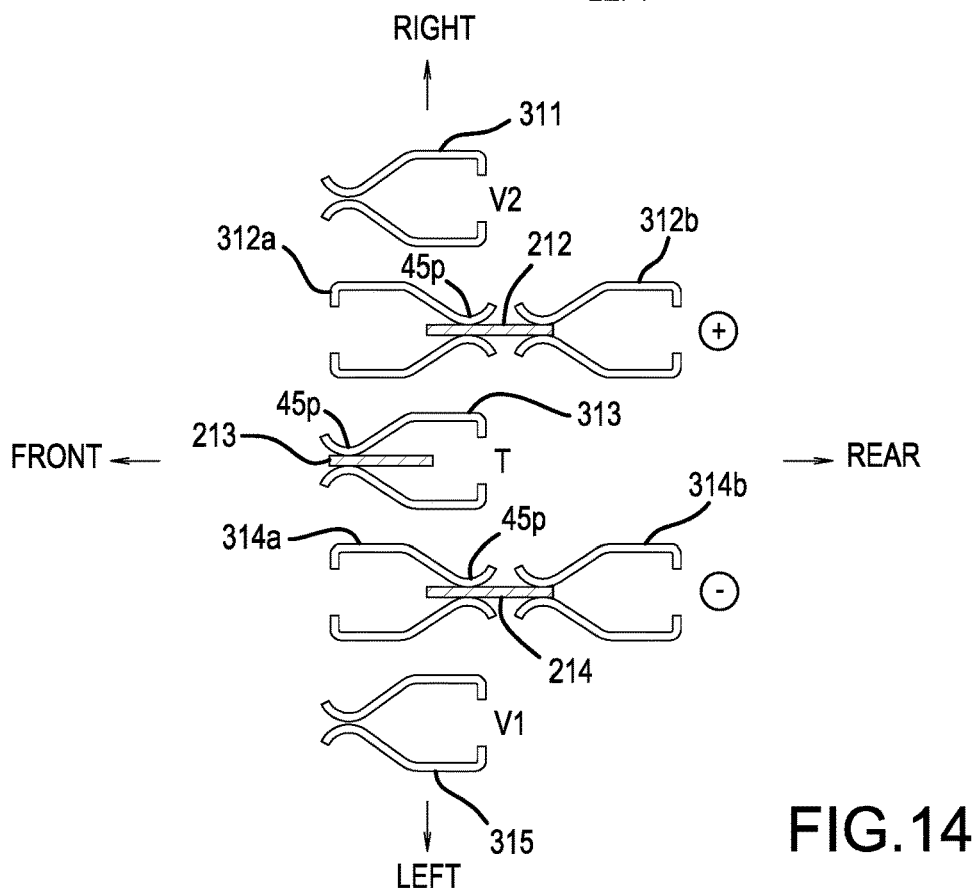
FIG. 14 is a plan view that shows the terminals of the power tool respectively electrically connected to the terminal clips of the battery pack.

Furthermore, when the battery pack 30 has been slid to an advance-limit position, as shown in FIG. 14, the terminals 212 (+), 213 (T), 214 (−) of the power tool 10 are respectively electrically connected to the terminals 312a (312b) (+), 313 (T), 314a (314b) (−) of the battery pack 30. That is, after the positive terminal 212 (+) of the power tool 10 has been inserted between the terminal-pressing surfaces 45p of the rear part of the positive terminal 312a on the front side of the battery pack 30, the positive terminal 212 (+) moves farther rearward and is inserted between the terminal-pressing surfaces 45p of the front part of the positive terminal 312b on the rear side. In addition, the temperature-signal terminal 213 (T) of the power tool 10 is inserted between the terminal-pressing surfaces 45p of the front part of the temperature-signal terminal 313 of the battery pack 30. Furthermore, after the negative terminal 214 (−) of the power tool 10 has been inserted between the terminal-pressing surfaces 45p of the rear part of the negative terminal 314a on the front side of the battery pack 30, the negative terminal 214 (−) moves farther rearward and is inserted between the terminal-pressing surfaces 45p of the front part of the negative terminal 314b on the rear side.

Furthermore, when the battery pack 30 has been slid to the advance-limit position, the hook 38 of the battery pack 30 mates (engages) with the slide-lock groove (not shown) of the power tool 10 owing to the spring force, and thereby the slide connection (engagement) of the battery pack 30 with respect to the power tool 10 is completed. As shown in FIG. 6, when the battery pack 30 has been connected to the power tool 10, the V2 terminal 311 and the V1 terminal 315 of the battery pack 30 are held in an unconnected state. Thus, the positive terminals 312a, 312b (+) and the negative terminals 314a, 314b (−) of the battery pack 30 correspond to pairs of battery-side, electric-power (plus and minus) terminals of the present teachings, and the temperature-signal terminal 313 (T) corresponds to a battery-side (first) signal terminal (a terminal used when controlling discharge of the battery cells) of the present teachings.

Overview of the Charger 50

As shown in FIG. 16, the battery-mounting part 52 is provided on the charger 50 on the right side of the upper surface of the charger 50. Consequently, in the state wherein the cover part 34 has been rotated (set) to the lower side (i.e. the cover part 34 faces downward), the battery pack 30 is slid onto and thereby connected to the battery-mounting part 52 of the charger 50. In this embodiment, the basic structure of the battery-mounting part 52 of the charger 50 is the same as that of the battery-mounting part 20 of the power tool 10, and an explanation thereof is therefore omitted. As shown in the circuit diagram in FIG. 15, the charging positive terminal 512 (+) and the charging negative terminal 514 (−) are provided on the battery-mounting part 52 of the charger 50 at locations respectively corresponding to the positive terminals 312a, 312b (+) and the negative terminals 314a, 314b (−) of the battery pack 30. The charging positive terminal 512 (+) and the charging negative terminal 514 (−) are electrically connected to a charging circuit 54 of the charger 50.

Figure 15:
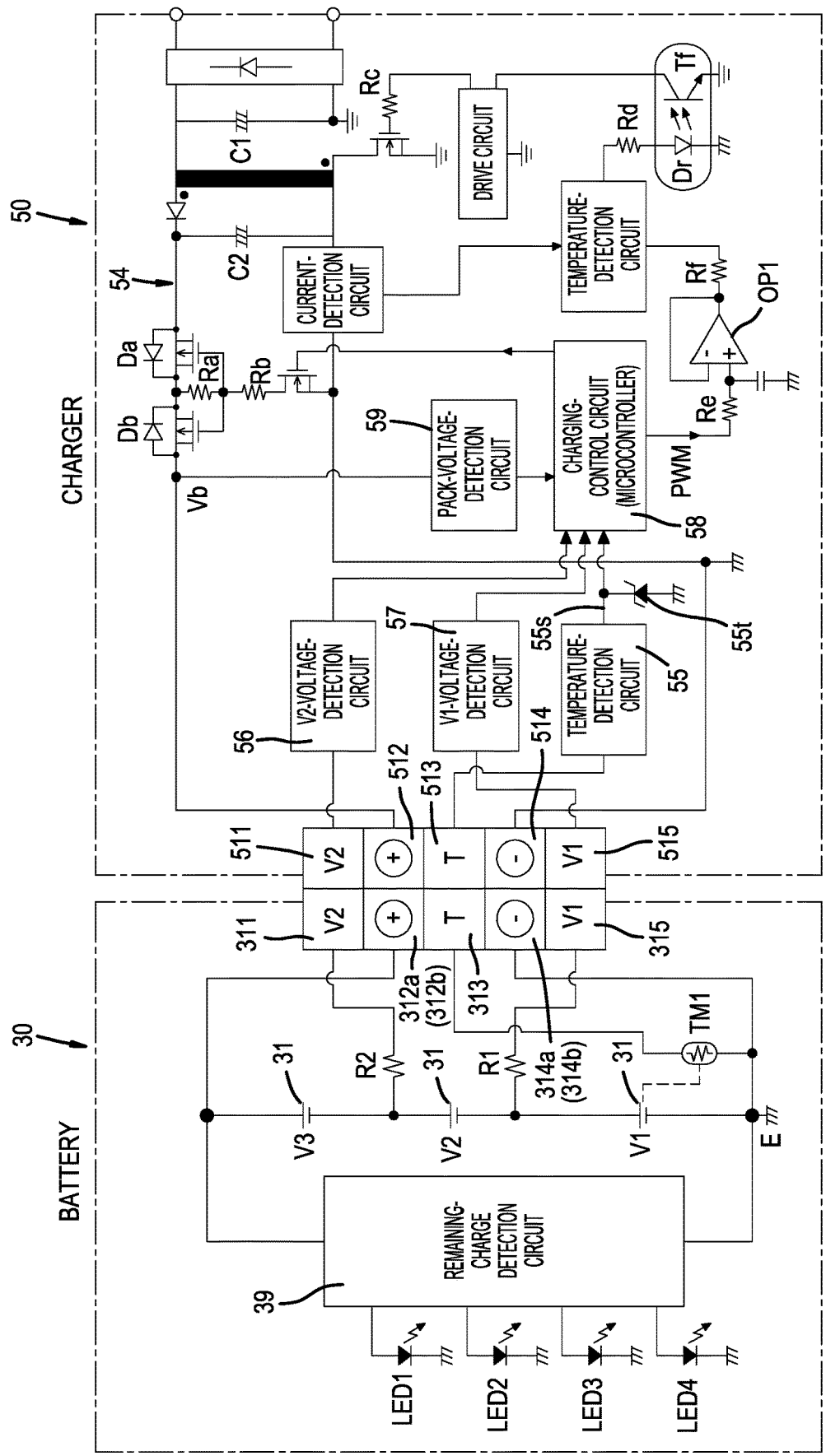
FIG. 15 is an electric circuit diagram of the battery pack and a charger electrically coupled to the battery pack.

In addition, as shown in FIG. 15, the temperature-signal terminal 513 (T), the V2 terminal 511, and the V1 terminal 515 are provided on the battery-mounting part 52 of the charger 50 at locations respectively corresponding to the temperature-signal terminal 313 (T), the V2 terminal 311, and the V1 terminal 315 of the battery pack 30. The temperature-signal terminal 513 (T) is electrically connected to a temperature-detection circuit 55. The V2 terminal 511 is electrically connected to a V2-voltage-detection circuit 56. The V1 terminal 515 is electrically connected to a V1-voltage-detection circuit 57. Furthermore, the output signals of the temperature-detection circuit 55, the V2-voltage-detection circuit 56, and the V1-voltage-detection circuit 57 are input to a charging-control microcontroller 58.

If the temperature value detected by the temperature-detection circuit 55 exceeds a permissible range during a charging operation, then the charging-control microcontroller 58 stops a switching device of the charging circuit 54. Consequently, it is possible to prevent the battery pack 30 from being charged at a high temperature or a low temperature, and thereby to prevent a reduction in the service life of the battery pack 30. In addition, the charging-control microcontroller 58 controls the charging such that the voltages of the cells 31 inside the battery pack 30, which are detected by a pack-voltage-detection circuit 59, the V1-voltage-detection circuit 57, and the V2-voltage-detection circuit 56, are less than a predetermined value. As a result, overcharging the cells 31 of the battery pack 30 can be prevented. If one or more the cells 31 become overcharged, there is a risk that the safety of the cells 31 will be impaired, and consequently it is necessary to monitor the voltage of each cell 31 during charging. In view of this requirement, it is necessary to provide the V2 terminal 311 and the V1 terminal 315 for charging operations, which means that additional terminals are required for charging that are not required when the battery pack 30 is connected to the power tool 10 (i.e. during discharging of the battery cells 31). That is, the charging positive terminal 512 (+) and the charging negative terminal 514 (−) of the charger 50 correspond to a pair of charging-electric-power terminals of the present teachings; and the temperature-signal terminal 513 (T), the V2 terminal 511, and the V1 terminal 515 each correspond to a charger-side (corresponding first) signal terminal of the present teachings. In addition, the V2 terminal 311 and the V1 terminal 315 of the battery pack 30 each correspond to a charging-dedicated, battery-side (second) signal terminal of the present teachings.

As shown in FIG. 15, a Zener diode 55t is provided between the temperature-detection circuit 55 and the charging-control microcontroller 58 of the charger 50. The Zener diode 55t is provided for the purpose of protecting the charging-control microcontroller 58 if, in the state shown in FIG. 15, a short circuit were to occur between the charging positive terminal 512 (+) and the temperature-signal terminal 513 (T). In this case, the (full) battery voltage (i.e. a relatively high voltage) would be applied to an output-signal line 55s of the temperature-detection circuit 55. That is, if the battery voltage is applied to the output-signal line 55s of the temperature-detection circuit 55, then the Zener diode 55t discharges that battery voltage to the ground terminal, thereby maintaining the voltage of the output-signal line 55s at the predetermined voltage of the Zener diode 55t. As a result, the high voltage is no longer applied to the signal terminal of the charging-control microcontroller 58 when a short circuit occurs, thereby protecting the charging-control microcontroller 58 from a high voltage above its rated voltage.

In addition, if a short circuit occurs between the charging positive terminal 512 (+) and the temperature-signal terminal 513 (T), then the output voltage of the temperature-detection circuit 55 becomes equal to the predetermined voltage (output maximum value: Hi) of the Zener diode 55t. As a result, the charging-control microcontroller 58 would (in case it is not protected from the short circuit) determine that the temperature of the cells 31 of the battery pack 30 is lower than the permissible temperature range and therefore would stop the switching device of the charging circuit 54. In addition, if a short circuit occurs between the temperature-signal terminal 513 (T) and the charging negative terminal 514 (−), then the voltage (the output voltage) of the output-signal line 55s of the temperature-detection circuit 55 becomes the minimum value (Low [0 V]). As a result, the charging-control microcontroller 58 would (again, in case it is not protected from the short circuit) determine that the temperature of the cells 31 of the battery pack 30 is higher than the permissible temperature range and therefore would stop the switching device of the charging circuit 54. Furthermore, instead of the Zener diode 55t, it is also possible to provide a diode such that it discharges the high voltage of the output-signal line 55s to the power supply circuit of the charging-control microcontroller 58.

Slide Connection Between Battery Pack 30 and Charger 50

Figure 17:
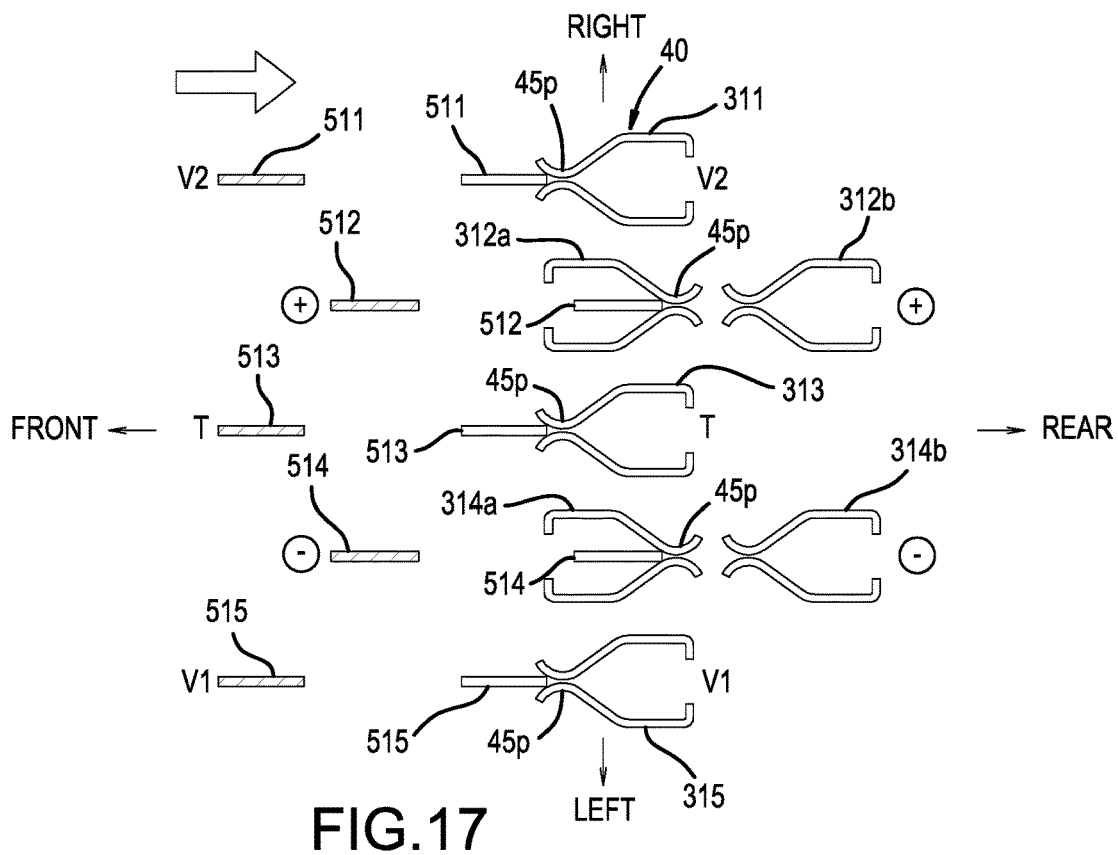
FIG. 17 is a plan view that shows a state before a connection is made between the terminals of the charger and the terminal clips of the battery pack.

As shown in the chain double-dashed lines in FIG. 17, in the sliding process performed when connecting the battery pack 30 and the charger 50, the terminals 511 (V2), 512 (+), 513 (T), 514 (−), 515 (V1) of the charger 50 simultaneously make contact with the terminal-pressing surfaces 45p of the terminals 311 (V2), 312a (+), 313 (T), 314a (−), 315 (V1) (the terminal clips 40), respectively, of the battery pack 30. That is, the terminals 511 (V2), 512 (+), 513 (T), 514 (−), 515 (V1) of the charger 50 are positionally set (positioned or located) in the sliding direction such that they simultaneously make contact with the terminal-pressing surfaces 45p of the corresponding terminal clips 40 (311 [V2], 312a [+], 313 [T], 314a [−], 315 [V1]). As a result of this design, the length dimension, in the sliding direction, of the terminals 511 (V2), 512 (+), 513 (T), 514 (−), 515 (V1) of the charger 50 can be minimized.

Figure 18:
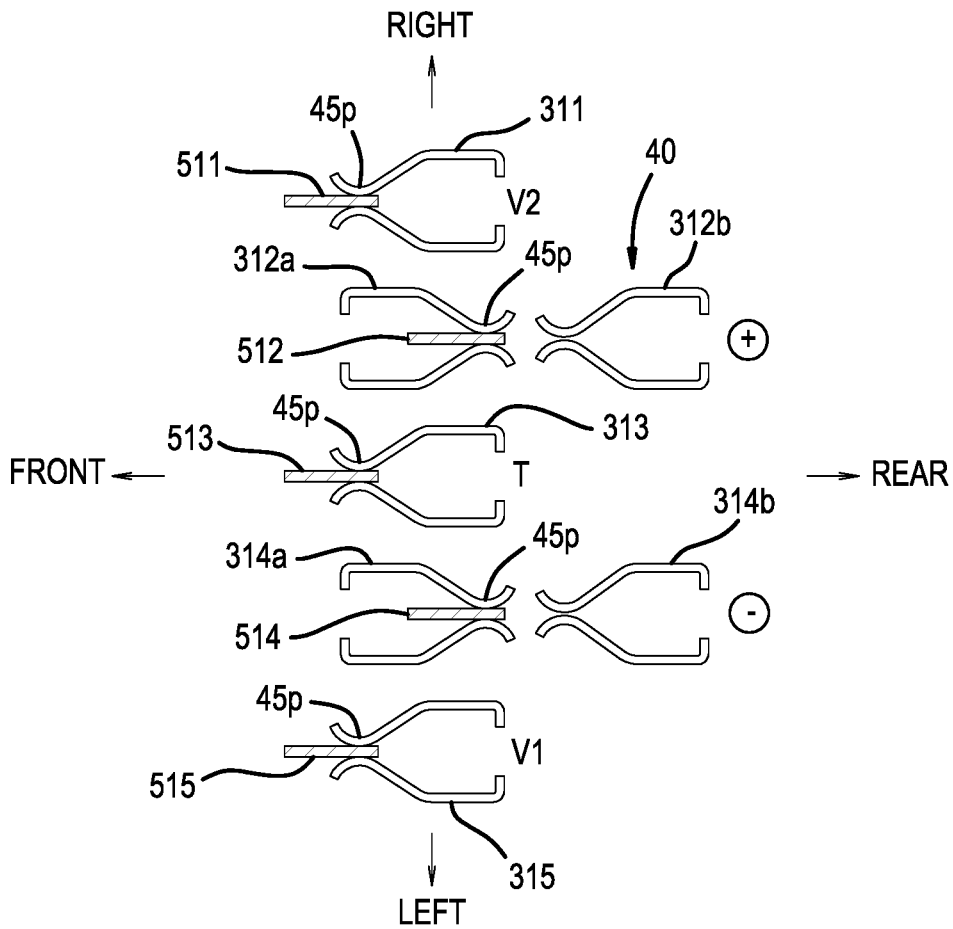
FIG. 18 is a plan view that shows the terminals of the power tool respectively electrically connected to the terminal clips of the battery pack.

Furthermore, as shown in FIG. 18, when the battery pack 30 has been slid onto the charger 50 to the advance-limit position, the terminals 511 (V2), 512 (+), 513 (T), 514 (−), 515 (V1) of the charger 50 and the corresponding terminals 311 (V2), 312a (+), 313 (T), 314a (−), 315 (V1) of the battery pack 30 are electrically connected. That is, the V2 terminal 511 of the charger 50 is inserted between the terminal-pressing surfaces 45p of the front part of the V2 terminal 311 of the battery pack 30. In addition, the charging positive terminal 512 (+) is inserted between the terminal-pressing surfaces 45p of the rear part of the positive terminal 312a on the front side of the battery pack 30. In addition, the temperature-signal terminal 513 (T) of the charger 50 is inserted between the terminal-pressing surfaces 45p of the front part of the temperature-signal terminal 313 of the battery pack 30. Furthermore, the charging negative terminal 514 (−) is inserted between the terminal-pressing surfaces 45p of the rear part of the negative terminal 314a on the front side of the battery pack 30. Furthermore, the V1 terminal 515 of the charger 50 is inserted between the terminal-pressing surfaces 45p of the front part of the V1 terminal 315 of the battery pack 30.

When the battery pack 30 has been slid onto the charger 50 to the advance-limit position, the hook 38 of the battery pack 30 mates (engages) with the slide-lock groove (not shown) of the charger 50 owing to the spring force, and thereby the slide connection (engagement) of the battery pack 30 with respect to the charger 50 is complete. Thus, in the state wherein the battery pack 30 and the charger 50 have been connected by sliding, the charging positive terminal 512 (+) and the charging negative terminal 514 (−) of the charger 50 are mechanically connected only to the positive terminal 312a and the negative terminal 314a on the front side of the battery pack 30, respectively, and are not mechanically connected to the positive terminal 312b and the negative terminal 314b on the rear side of the battery pack 30. Consequently, frictional resistance can be reduced when connecting or disconnecting the battery pack 30 and the charger 50.

Advantages of Battery Packs According to the Present Embodiment

In the battery pack 30 according to the above-described embodiment, the positive terminals 312a, 312b (+), the temperature-signal terminal 313 (T), and the negative terminals 314a, 314b (−), which connect to the positive terminal 212 (+), the temperature-signal terminal 213 (T), and the negative terminal 214 (−), respectively, of the power tool 10, are configured such that they are disposed in parallel (aligned) in the direction (the left-right direction) that intersects (e.g., is orthogonal to) the sliding direction and are spaced apart by the minimum spacing required to prevent a short circuit. That is, the dimension (length), from the right end to the left end, of the positive terminals 312a, 312b (+), the temperature-signal terminal 313 (T), and the negative terminals 314a, 314b (−) can be set to the required minimum. As a result, the dimension (length), from the right end to the left end, of the positive terminal 212 (+), the temperature-signal terminal 213 (T), and the negative terminal 214 (−) of the power tool 10 can be set to the required minimum. As a result, it is possible to make the battery-mounting part 20 in the power tool 10 compact, i.e. narrower in the width (left-right) direction. In addition, because the temperature-signal terminal 313 (T) is disposed between the positive terminals 312a, 312b (+) and the negative terminals 314a, 314b (−), a short circuit is less likely to occur between the positive terminals 312a, 312b (+) and the negative terminals 314a, 314b (−).

In addition, because the V2 terminal 311 and the V1 terminal 315 (the charging-dedicated, battery-side signal terminals), which are not used/connected when the battery pack 30 is mounted on the power tool 10, are disposed on the outer sides in the direction that the terminals are disposed in parallel, the battery-mounting part 20 of the power tool 10 can be kept small, because the battery-mounted part 20 need not be wide enough to engage these outer terminals 311, 315. Furthermore, the terminal clips 40 are formed of the same shape and size and are disposed equispaced in the left-right direction (the direction that intersects the sliding direction). Consequently, the design is simple and a reduction in manufacturing costs can be achieved. In addition, in the state wherein the first-ends (first sides) and the second-ends (second sides) of adjacent terminal clips 40 alternate such that they are reversely (inversely) oriented, these terminal clips 40 are disposed in parallel (aligned) in the direction that intersects the sliding direction. Consequently, the distance between adjacent terminals can be minimized while still minimizing short circuits.

In addition, the positive terminals 312a, 312b (+) of the battery pack 30 comprise two of the terminal clips 40 aligned (disposed in parallel) in the sliding direction, and the negative terminals 314a, 314b (−) of the battery pack 30 comprise two of the terminal clips 40 aligned (disposed in parallel) in the sliding direction. Consequently, in each case, the discharge current and the charging current each flow in a distributed manner to the two terminal clips 40, which makes it possible to reduce the generation of heat in the terminal clips 40 (or increase the heat dissipation rate) due to the greater surface area. In addition, in each case, the two terminal clips 40 are disposed such that their first-end sides, which sandwich the terminals, oppose one another in the sliding direction. Consequently, the insertion of the terminal through the terminal clip 40 on the front side until it reaches the tip side (the first-end side) of the terminal clip 40 on the rear side makes it possible to electrically connect that terminal with the two terminal clips 40. Accordingly, the length in the insertion dimension (direction) of the power tool terminal can be set to the required minimum, and the length dimension of the terminal can be minimized.

MODIFIED EXAMPLES

Figure 19:
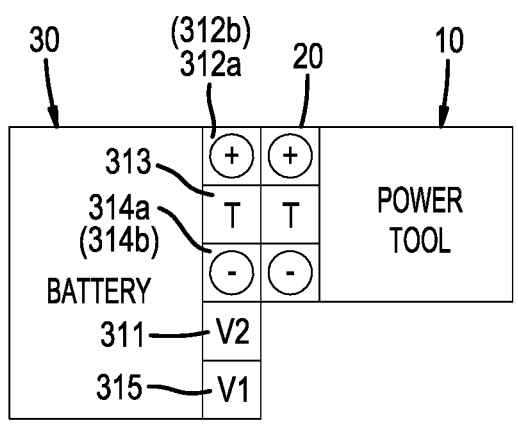
FIG. 19 is a schematic drawing that shows a terminal-connection state between the battery pack and the power tool according to a first modified example.
Figure 20:
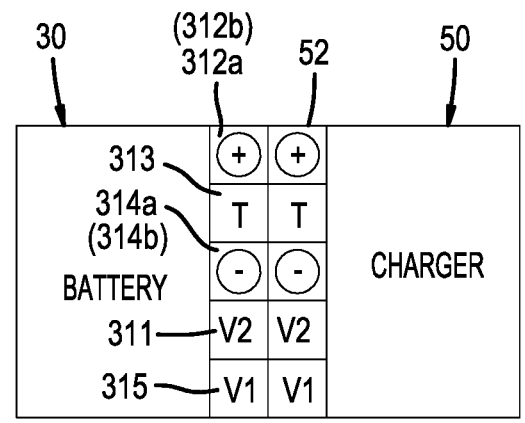
FIG. 20 is a schematic drawing that shows a terminal-connection state between the battery pack and the charger according to the first modified example.
Figure 21:
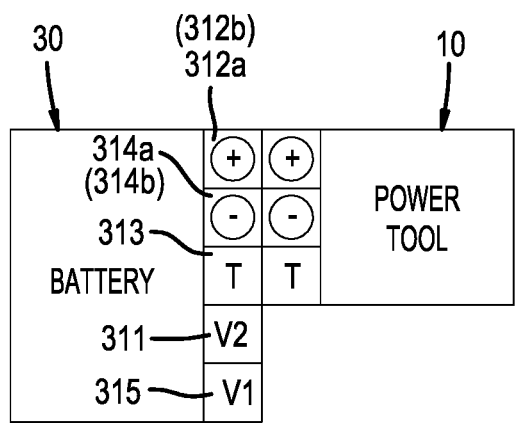
FIG. 21 is a schematic drawing that shows a terminal-connection state between the battery pack and the power tool according to a second modified example.
Figure 22:
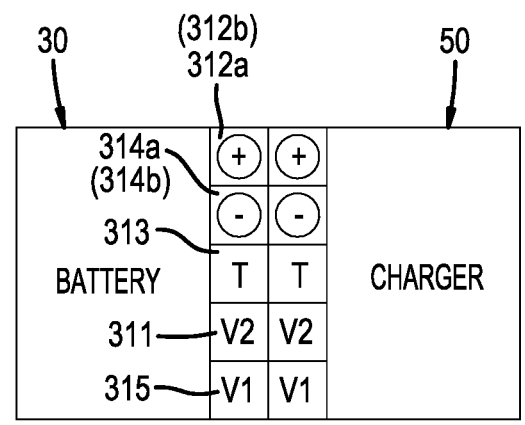
FIG. 22 is a schematic drawing that shows a terminal-connection state between the battery pack and the charger according to the second modified example.
Figure 23:
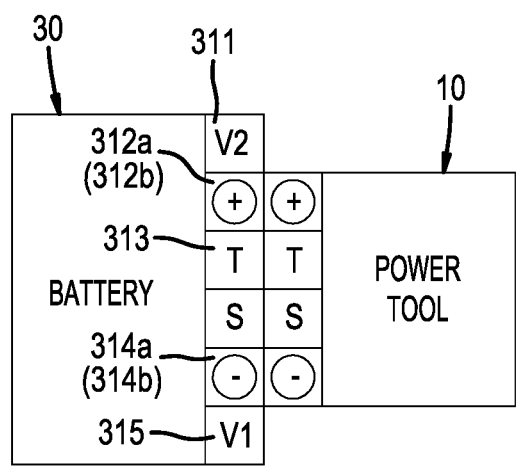
FIG. 23 is a schematic drawing that shows a terminal-connection state between the battery pack and the power tool according to a third modified example.
Figure 24:
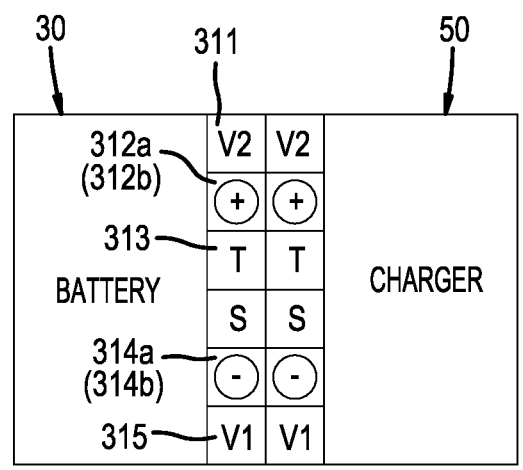
FIG. 24 is a schematic drawing that shows a terminal-connection state between the battery pack and the charger according to the third modified example.

The above explanation described a representative, non-limiting embodiment of the present teachings based on FIGS. 1-18, but the present teachings are not limited to this embodiment, and it is understood that variations and modifications may be effected without departing from the spirit and scope of the invention. For example, the above-described embodiment provided an example wherein the positive terminals 312a, 312b (+), the temperature-signal terminal 313 (T), and the negative terminals 314a, 314b (−), which are connected to the power tool 10, are disposed in a center portion, and the V2 terminal 311 and the V1 terminal 315 (refer to FIG. 15), which are connected only to the charger 50, are disposed on both the left and right sides, as shown in FIG. 6. However, as shown in FIG. 19 and FIG. 20, it is also possible to dispose the positive terminals 312a, 312b (+), the temperature-signal terminal 313 (T), and the negative terminals 314a, 314b (−), which connect to the power tool 10, near, for example, the first-end (side) in the width direction, and to dispose the V2 terminal 311 and the V1 terminal 315 near the second-end (side) in the width direction. In addition, as shown in FIG. 6, the above-described embodiment provided an example wherein the temperature-signal terminal 313 (T) is disposed between the positive terminals 312a, 312b (+) and the negative terminals 314a, 314b (−). However, as shown in FIG. 21 and FIG. 22, it is also possible to dispose the temperature-signal terminal 313 (T) on an outer side of the positive terminals 312a, 312b (+) and the negative terminals 314a, 314b (−). In addition, the above-described embodiment provided an example wherein one of the signal terminals (the temperature-signal terminal 313 [T]) is disposed between the positive terminals 312a, 312b (+) and the negative terminals 314a, 314b (−). However, as shown in FIG. 23 and FIG. 24, it is also possible to dispose a plurality of signal terminals (T) (S) between the positive terminals 312a, 312b (+) and the negative terminals 314a, 314b (−).

Figure 25:
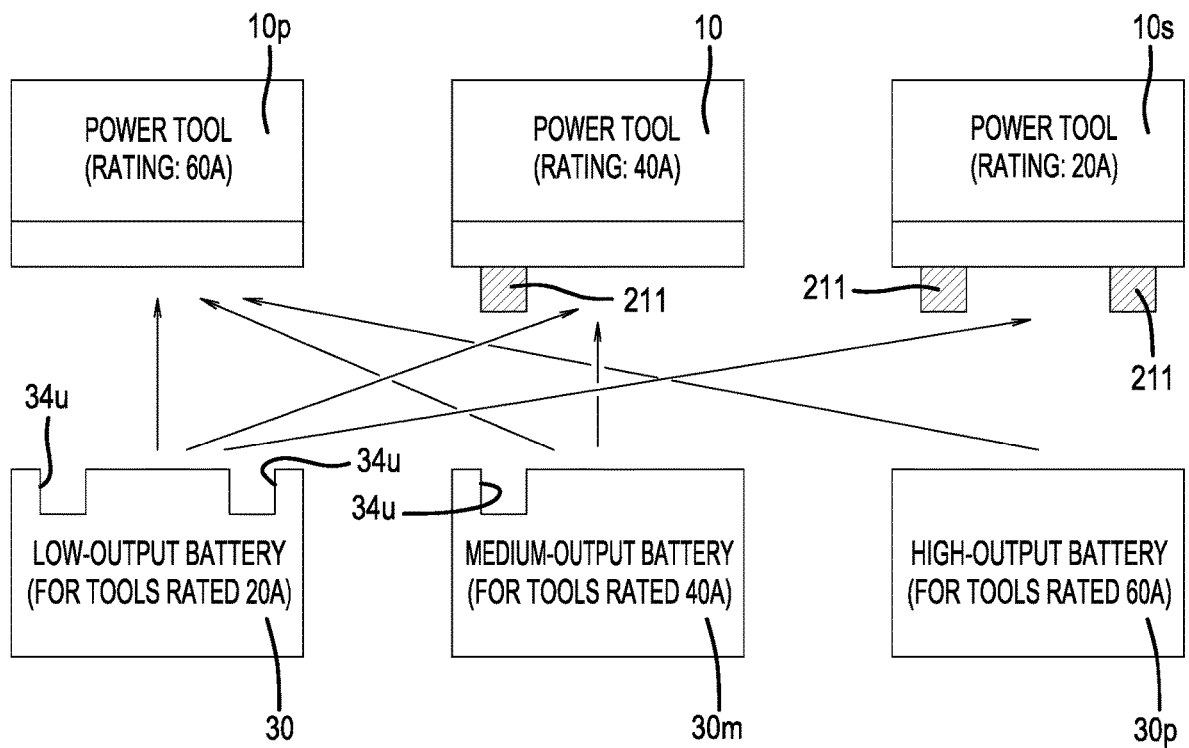
FIG. 25 is a schematic drawing that shows combinations of the battery packs and the power tools according to a fourth modified example.

The battery pack 30 according to the above-described embodiment is a low-output battery pack (for tools having a current rating of 20 A) as described above. Consequently, as shown in FIG. 25, even if the battery pack is used with (electrically connected to) a small-size power tool 10s having a current rating of 20 A, a mid-size power tool 10 having a current rating of 40 A, or a large-size power tool 10p having a current rating of 60 A, there is no risk of damage to any of the power tools 10s, 10, 10p caused by the flow of an overcurrent. Consequently, the battery pack 30 can be used with any of the power tools 10s, 10, 10p. Accordingly, as shown in FIG. 2 and the left figure in FIG. 25, in the battery pack 30 according to the above-described embodiment, a pair of the left and right insertion-permitting rectangular grooves 34u is formed in the upper surface of the cover part 34. In contrast, the misinsertion-prevention projections 211, which mate with the insertion-permitting rectangular grooves 34u of the battery pack 30, are not provided on the large-size power tool 10p having a rating of 60 A. One of the misinsertion-prevention projections 211, which mates with one of the insertion-permitting rectangular grooves 34u of the battery pack 30, is provided on the mid-size power tool 10 having a rating of 40 A. In addition, two of the misinsertion-prevention projections 211, which are capable of mating with the insertion-permitting rectangular grooves 34u of the battery pack 30, are provided on the small-size power tool 10s having a rating of 20 A. That is, because the pair of left and right insertion-permitting rectangular grooves 34u is formed on the battery pack 30, a slide connection becomes possible on both the power tools 10s, 10, each of which comprises the misinsertion-prevention projections 211, and the power tool 10p, which does not have the misinsertion-prevention projections 211.

In contrast with the low-output battery pack 30 (for tools having a current rating of 20 A), if a medium-output battery pack 30m (for tools having a current rating of at 40 A) were capable of being connected to the small-size power tool 10s having a rating of 20 A, then there would be a risk of damage to the small-size power tool 10s caused by an overcurrent. Consequently, as shown in FIG. 25, in the medium-output battery pack 30m (for tools having a current rating of 40 A), the insertion-permitting rectangular groove 34u is formed only at the location corresponding to the misinsertion-prevention projection 211 of the mid-size power tool 10 having a rating of 40 A. Accordingly, the medium-output battery pack 30m (for tools having a current rating of 40 A) cannot be slid onto and thereby connected to the small-size power tool 10s having a rating of 20 A. That is, it becomes possible for the medium-output battery pack 30m (for tools having a current rating of 40 A) to be slid onto and thereby connected to the mid-size power tool 10, which has a rating of 40 A, and the large-size power tool 10p, which has a rating of 60 A.

Figure 26:
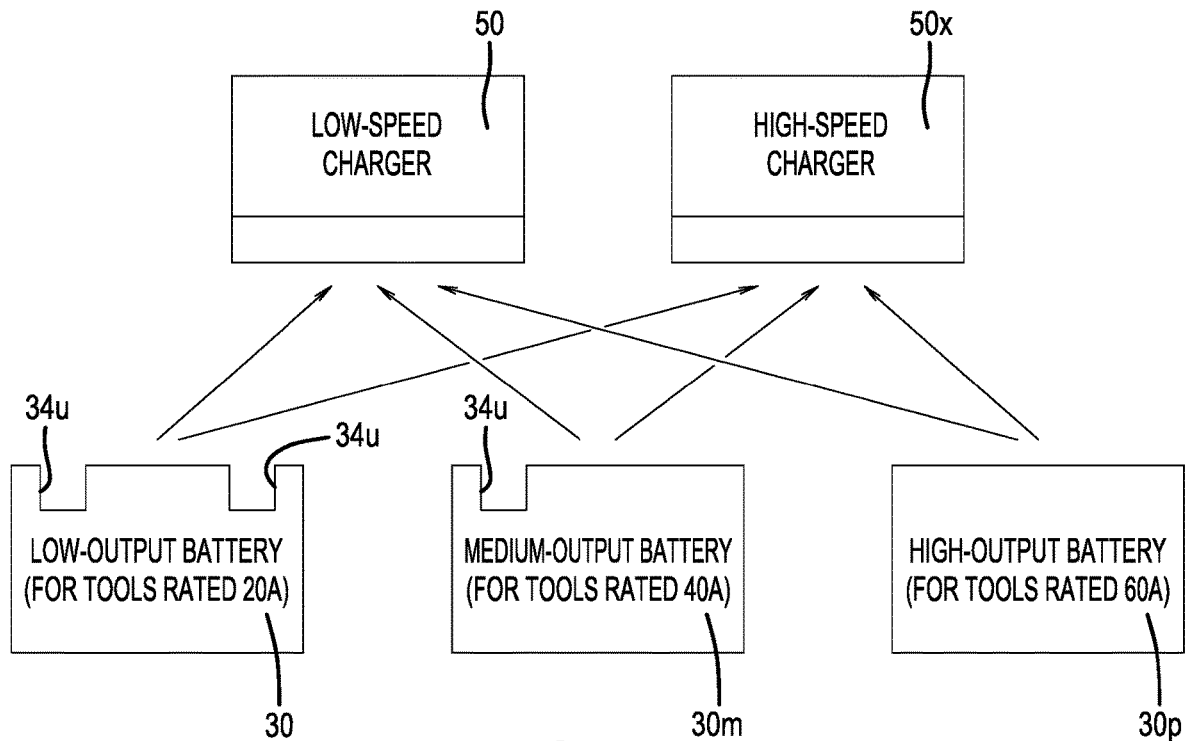
FIG. 26 is a schematic drawing that shows combinations of the battery packs and the chargers according to the fourth modified example.
Figure 27:
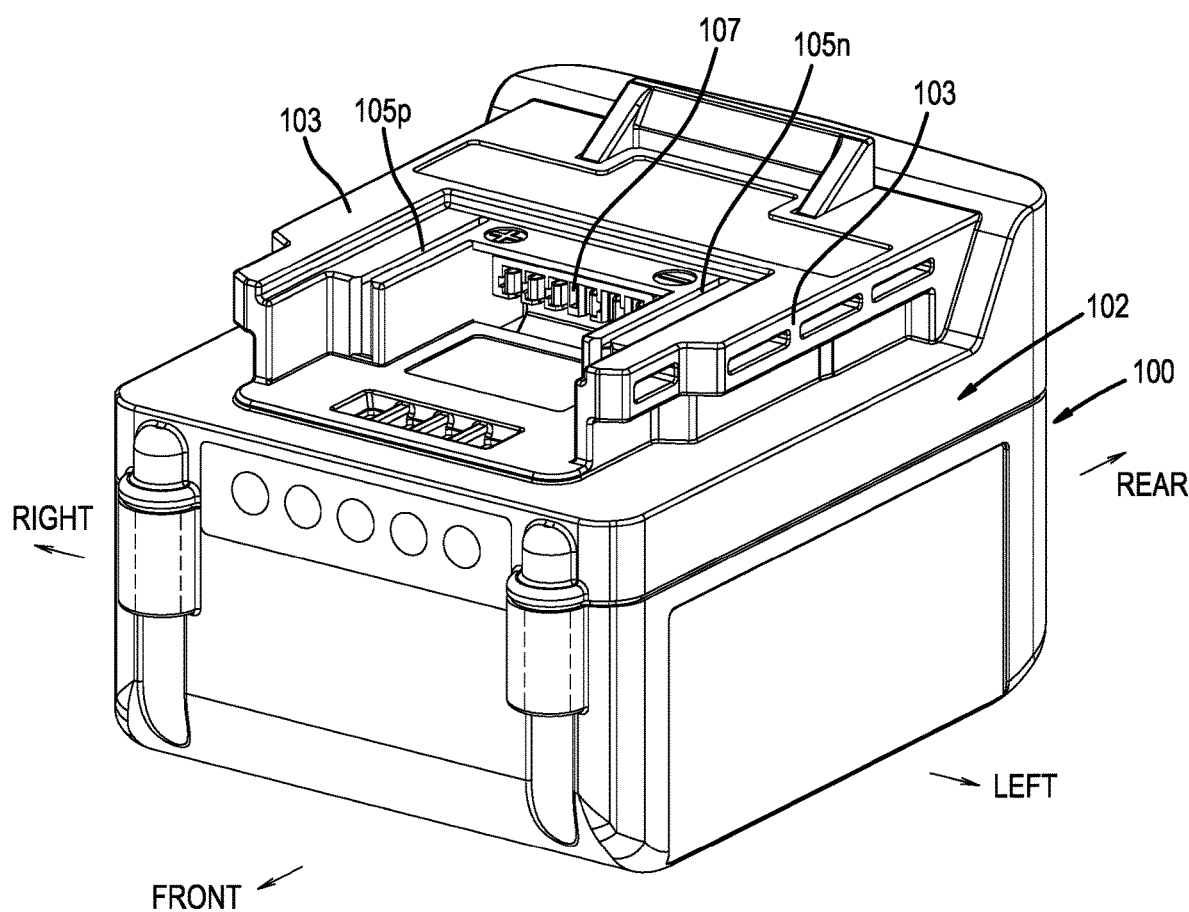
FIG. 27 is an oblique view that shows a known battery pack.

In addition, in the case of a high-output battery pack 30p (for tools having a current rating of 60 A), as shown in FIG. 25, the insertion-permitting rectangular groove 34u is not provided. Consequently, the high-output battery pack 30p (for tools having a current rating of 60 A) can no longer be slid onto and thereby connected to the small-size power tool 10s having a rating of 20 A and the mid-size power tool 10 having a rating of 40 A, both of which comprise the misinsertion-prevention projections 211. That is, it becomes possible for the high-output battery pack 30p (for tools having a current rating of 60 A) to be slid onto and thereby connected to only the large-size power tool 10p, which has a rating of 60 A and does not have the misinsertion-prevention projections 211. Here, in the case of chargers as shown in FIG. 26, regardless of whether the charger is the low-speed charger 50 or a high-speed charger 50x, the misinsertion-prevention projections 211 are not provided, as in the large-size power tool 10p having a rating of 60 A. Accordingly, it becomes possible for any of the battery packs, that is, the low-output battery pack 30 (for tools having a current rating of 20 A), the medium-output battery pack 30m (for tools having a current rating of 40 A), and the high-output battery pack 30p (for tools having a current rating of 60 A), to be slid onto and thereby connected to the low-speed charger 50 or the high-speed charger 50x.

The above-described embodiment provided an example wherein the positive terminals 312a, 312b (+) of the battery pack 30 comprise two of the terminal clips 40 aligned (disposed in parallel) in the sliding direction, and the negative terminals 314a, 314b (−) of the battery pack 30 comprise two of the terminal clips 40 aligned (disposed in parallel) in the sliding direction. However, it is also possible for the positive terminals 312a, 312b (+) to comprise one large-size terminal clip, and the negative terminals 314a, 314b (−) to comprise one large-size terminal clip. In addition, the above-described embodiment provided an example wherein three of the cells 31 are stored, in a state such that they are disposed in parallel in the left-right direction, in the housing-main-body part 32 of the battery pack 30. However, it is also possible to stack three of the cells 31 per level in two levels (i.e. six total battery cells 31) and store them inside the housing-main-body part 32. In such an embodiment, it is possible to increase the capacity of the battery pack at the same rated voltage by forming three sets of parallel cell assemblies, each parallel cell assembly comprising two of the cells 31 connected in parallel, and then connecting the three sets of parallel cell assemblies in series.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery packs for power tools and methods of making and operating the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Depending on design requirements, exemplary embodiments of the control microcontroller 17 of the present disclosure may be implemented in hardware and/or in software. The control microcontroller 17 can be configured using a digital storage medium, for example one or more of a ROM, a PROM, an EPROM, an EEPROM, a flash memory, etc., on which electronically readable control signals (program code) are stored, which interact or can interact with one or more programmable hardware components to execute programmed functions.

The (each) programmable hardware component can be formed by a processor, a computer processor (CPU=central processing unit), an application-specific integrated circuit (ASIC), an integrated circuit (IC), a computer, a system-on-a-chip (SOC), a programmable logic element, and/or a field programmable gate array (FGPA). A microprocessor is a typical component of a microcontroller according to the present teachings.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods or functions described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the control microcontroller 17, are implemented as a program, firmware, computer program, or computer program product including a program, or as data, wherein the program code or the data is operative to perform one of the methods when the program runs on (is executed by) a processor or a programmable hardware component. The program code or the data can for example also be stored on a machine-readable carrier or data carrier, such as any of the types of digital storage media described above. The program code or the data can be, among other things, source code, machine code, bytecode or another intermediate code.

A program according to an exemplary embodiment can implement one of the methods or function during its performance, for example, such that the program reads storage locations and/or writes one or more data elements into these storage locations, wherein switching operations or other operations are induced in transistor structures, in amplifier structures, or in other electrical, electronic, optical, magnetic components, or components based on another functional or physical principle. Correspondingly, data, values, sensor values, or other program information can be captured, determined, or measured by reading a storage location. By reading one or more storage locations, a program can therefore capture, determine or measure sizes, values, variables, and other information, as well as cause, induce, or perform an action by writing in one or more storage locations, as well as control other apparatuses, machines, and components, and thus for example also perform any complex process that the air compressor may be designed to perform.

Although some aspects of the present teachings have been described in the context of a device or apparatus, it is to be understood that these aspects also represent a description of a corresponding method, so that a block or a component of a device or apparatus is also understood as a corresponding method step or as a feature of a method step. In an analogous manner, aspects which have been described in the context of or as a method step also represent a description of a corresponding block or detail or feature of a corresponding device.

The present teachings can be applied to any type of cordless (battery-powered) electric power tool, including but not limited to electric power tools for processing metals, electric power tools for processing wood, electric power tools for processing stone, and electric power tools for gardening. Specific examples include, but are not limited to, electric driver-drills, electric impact and screw drivers, electric impact wrenches, electric grinders, electric circular saws, electric reciprocating saws, electric jig saws, electric band saws, electric hammers, electric cutters, electric chain saws, electric planers, electric nailers (including electric rivet guns), electric staplers, electric shears, electric hedge trimmers, electric lawn clippers, electric lawn mowers, electric brush cutters, electric blowers (leaf blowers), electric flashlights, electric concrete vibrators and electric vacuum cleaners.

EXPLANATION OF THE REFERENCE NUMBERS

10 Power tool
30 Battery pack
31 Cell
40 Terminal clip
50 Charger
212 Positive terminal (tool-side, power-supply terminal)
213 Temperature-signal terminal (tool-side signal terminal)
214 Negative terminal (tool-side, power-supply terminal)
311 V2 terminal (charging-dedicated, battery-side signal terminal)
312a Positive terminal (battery-side, electric-power terminal)
312b Positive terminal (battery-side, electric-power terminal)
313 Temperature-signal terminal (battery-side signal terminal)
314a Negative terminal (battery-side, electric-power terminal)
314b Negative terminal (battery-side, electric-power terminal)
315 V1 terminal (charging-dedicated, battery-side signal terminal)
511 V2 terminal (charger-side signal terminal)
512 Charging positive terminal (charging-electric-power terminal)
513 Temperature-signal terminal (charger-side signal terminal)
514 Charging negative terminal (charging-electric-power terminal)
515 V1 terminal (charger-side signal terminal)
TM1 Thermistor (protecting means)

The invention claimed is:

1. A battery pack configured to couple to a power tool by sliding in a sliding direction relative to the power tool, comprising:
   a plurality of battery cells disposed in a housing;
   a plurality of tool connection terminals of the battery pack configured to electrically connect to corresponding power tool terminals of the power tool, the plurality of tool connection terminals of the battery pack including a plus power terminal, a minus power terminal and a first signal terminal; and
   at least one charger connection terminal of the battery pack dedicated to only electrically connect to at least one corresponding charger terminal of a charger;
   wherein the at least one charger connection terminal of the battery pack is disposed on an outer side of the plurality of tool connection terminals of the battery pack in a direction that intersects the sliding direction.

2. The battery pack according to claim 1, wherein the at least one charger connection terminal comprises a second signal terminal.

3. The battery pack according to claim 1, wherein the minus power terminal of the battery pack is configured to connect to a minus power terminal of the charger.

4. The battery pack according to claim 1, wherein the first signal terminal of the battery pack is configured to connect to a first signal terminal of the charger.

5. The battery pack according to claim 1, wherein the first signal terminal of the battery pack is disposed between the plus and minus power terminals of the battery pack.

6. The battery pack according to claim 1, wherein the first signal terminal of the battery pack is configured to transmit a signal to the power tool for use in controlling the discharging of the battery cells.

7. The battery pack according to claim 1, wherein the first signal terminal of the battery pack is configured to transmit, to the power tool or to the charger, a signal containing information concerning a temperature of the battery cells.

8. The battery pack according to claim 1, wherein the at least one second signal terminal of the battery pack is configured to transmit, to the charger, a signal containing information concerning the voltage of the battery cells.

9. The battery pack according to claim 1, wherein the minus power terminal of the battery pack is disposed between the plus power terminal of the battery pack and the first signal terminal of the battery pack.

10. The battery pack according to claim 1, wherein:
the first signal terminal of the battery pack is configured to connect to a first signal terminal of the charger, and
a second signal terminal of the battery pack is configured to connect to a second signal terminal of the charger.

11. The battery pack according to claim 1, wherein the plus and minus power terminals of the battery pack and the first signal terminal of the battery pack each comprise one or more terminal clips, which are all formed with the same shape and size and are disposed equispaced in the direction that intersects the sliding direction.

12. The battery pack according to claim 11, wherein:
the terminal clips each comprise a pair of electrically-conducting, elastically-resilient contacts extending in the sliding direction from a first end to a second end, the contacts having a first width at the first end and a second width at the second end, the first width being less than the second width,
the first ends of the contacts being respectively configured to squeeze the corresponding plate-shaped power and signal terminals of the power tool to electrically connect thereto, and
the terminal clips of the plus and minus power terminals of the battery pack and the first signal terminal of the battery pack are disposed in parallel along a line at least substantially orthogonal to the sliding direction and such that the first ends and the second ends are oriented in an alternating manner.

13. The battery pack according to claim 11, wherein each of the plus and minus power terminals of the battery pack comprises two or more of the terminal clips disposed in parallel and aligned in the sliding direction.

14. The battery pack according to claim 11, wherein the terminal clip that constitutes the first signal terminal of the battery pack is disposed such that its first-end and its second-end are reversely oriented with respect to the terminal clips that constitute the plus and minus power terminals of the battery pack.

15. The battery pack according to claim 11, wherein the terminal clip that constitutes the at least one second signal terminal of the battery pack is disposed such that its first-end and second-end are reversely oriented with respect to the terminal clips that constitute the plus and minus power terminals of the battery pack.

16. A battery pack configured to couple to a power tool by sliding in a sliding direction relative to the power tool, comprising:
a plurality of battery cells disposed in a housing;
a plurality of first connection terminals of the battery pack configured to electrically connect to a corresponding plurality of first power tool terminals of the power tool and to electrically connect to a corresponding plurality of first charger terminals of a charger;
a second connection terminal of the battery pack configured to only electrically connect to a second charger terminal of the charger or to only electrically connect to a second power tool terminal of the power tool;
wherein the second connection terminal of the battery pack is disposed on an outer side of the plurality of first connection terminals of the battery pack in a direction that intersects the sliding direction.

17. The battery pack according to claim 16, wherein the second connection terminal is a signal terminal.

18. The battery pack according to claim 16, wherein the plurality of first connection terminals of the battery pack comprises at least three connection terminals.

19. The battery pack according to claim 16, wherein the second connection terminal is configured to electrically connect only to the second connection terminal of the charger.

20. A battery pack configured to couple to a power tool by sliding in a sliding direction relative to the power tool, comprising:
a plurality of battery cells disposed in a housing;
exactly three first connection terminals of the battery pack configured to electrically connect to exactly three first power tool terminals of the power tool and to electrically connect to exactly three first charger terminals of a charger; and
a second connection terminal of the battery pack configured to only electrically connect to a second charger terminal of the charger;
wherein the second connection terminal of the battery pack is disposed on an outer side of the plurality of first connection terminals of the battery pack in a direction that intersects the sliding direction.

21. A battery pack configured to be coupled to a power tool and a charger by sliding from one direction, the battery pack comprising:
a plurality of battery cells;
a plurality of tool connected terminals that are connected to a plurality of tool-side terminals provided at the power tool when the battery pack is connected to the power tool; and
at least one charger connected terminal that is not connected to the plurality of tool-side terminals when the battery pack is connected to the power tool but is electrically connected to a charger-side terminal of the charger when the battery pack is connected to the charger;
wherein:
the plurality of tool connected terminals and the at least one charger connected terminal are disposed in parallel in a direction intersecting a sliding direction of the battery pack, and
the at least the one charger connected terminal is disposed on an outer side in a direction that the plurality of tool connected terminals are disposed in parallel.

22. The battery pack according to claim 21, wherein the plurality of tool connected terminals and the at least one charger connected terminal are spaced apart from each other by a predetermined pitch.

23. The battery pack according to claim 21, wherein the plurality of tool connected terminals and the at least one charger connected terminal are disposed adjacently to each other.

24. The battery pack according to claim 21, wherein the plurality of battery cells are electrically connected in series and disposed such that axes of the plurality of battery cells are arranged in parallel to each other, and wherein an electrical circuit board is disposed over the plurality of battery cells.

25. The battery pack according to claim 21, wherein at least one of the plurality of tool connected terminals is a dual-purpose battery-side terminal that is electrically connected to a charger-side terminal provided at the charger when the battery pack is connected to the charger.

26. The battery pack according to claim 25, wherein the plurality of tool connected terminals includes a positive power terminal and a negative power terminal for supplying power to the power tool,
    wherein the dual-purpose battery-side terminal is a temperature signal terminal configured to transmit signals containing temperature related data of the battery cell to the power tool or the charger, and is located between the positive power terminal and the negative power terminal.

27. The battery pack according to claim 21, wherein an insertion-permitting groove is formed in an upper surface of the battery pack, the insertion-permitting groove extends in a front-rear direction to permit a miss-insertion-prevention projection formed on the power tool to be inserted, while the insertion-permitting groove is not formed in a battery pack of a different output so that the insertion-permitting groove prevents the battery pack of the different output is erroneously connected to the power tool.

28. The battery pack according to claim 21, further comprising slits formed in locations corresponding to the plurality of tool connected terminals and at least the one charger connected terminal, wherein the slits are configured to allow the plurality of tool connected terminals and the charger connected terminal to be inserted into the slits, and wherein a length in a longitudinal direction of each of the slits is set to be a same length.

\* \* \* \* \*